United States Patent
Kim et al.

(10) Patent No.: US 10,151,869 B2
(45) Date of Patent: Dec. 11, 2018

(54) OPTICAL MEMBER AND LIGHTING DEVICE USING THE SAME

(71) Applicant: LG INNOTEK CO., LTD., Seoul (KR)

(72) Inventors: Jin Su Kim, Seoul (KR); Seung Jong Baek, Seoul (KR); Dong Hyun Lee, Seoul (KR); Jae Hyuk Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/614,069

(22) Filed: Feb. 4, 2015

(65) Prior Publication Data
US 2015/0219827 A1   Aug. 6, 2015

(30) Foreign Application Priority Data

Feb. 5, 2014   (KR) .................. 10-2014-0013288

(51) Int. Cl.
*F21V 8/00*   (2006.01)
*G02B 5/02*   (2006.01)
(Continued)

(52) U.S. Cl.
CPC ............ *G02B 6/0038* (2013.01); *F21S 41/24* (2018.01); *F21S 43/239* (2018.01); *F21S 43/245* (2018.01);
(Continued)

(58) Field of Classification Search
CPC .. G02B 6/0053; G02B 6/0011; G02B 6/0051; G02B 6/0055; G02B 6/0038;
(Continued)

(56) References Cited

U.S. PATENT DOCUMENTS

| | | | |
|---|---|---|---|
| 6,628,460 B1* | 9/2003 | Ookawa | G02B 5/045 359/443 |
| 7,269,328 B2* | 9/2007 | Tang | G02B 6/0053 349/64 |

(Continued)

FOREIGN PATENT DOCUMENTS

EP   2 889 532   7/2015

OTHER PUBLICATIONS

European Search Report dated Jul. 20, 2017 issued in Application No. 14881651.5.

*Primary Examiner* — Anh Mai
*Assistant Examiner* — Fatima Farokhrooz
(74) *Attorney, Agent, or Firm* — KED & Associates, LLP

(57) ABSTRACT

An optical member includes: a light guide portion; a three-dimensional effect forming portion; and a multi-effect forming portion. The three-dimensional effect forming portion comprises multiple main patterns sequentially arranged on the first surface in a first direction and having respective inclined surfaces. The multiple main patterns guide an incident beam to a first surface direction or a second surface direction, thereby creating a line-shaped beam of a first path crossing at right angles to each pattern extension direction of the multiple patterns. The multi-effect forming portion comprises multiple optical patterns sequentially arranged in a second direction crossing a first direction and configured for converting a single line-shaped beam of the first path into multiple line-shaped beams.

20 Claims, 16 Drawing Sheets

(51) Int. Cl.
  *F21S 41/24* (2018.01)
  *F21S 43/239* (2018.01)
  *F21S 43/245* (2018.01)
  *F21S 43/249* (2018.01)
  *G02B 3/00* (2006.01)

(52) U.S. Cl.
  CPC .......... *F21S 43/249* (2018.01); *G02B 5/0231* (2013.01); *G02B 6/009* (2013.01); *G02B 6/0065* (2013.01); *G02B 6/0073* (2013.01); *G02B 6/0088* (2013.01); *G02B 3/005* (2013.01)

(58) Field of Classification Search
  CPC .. G02B 6/0065; G02B 6/0073; G02B 6/0088; G02B 6/005; G02B 6/009; G02B 6/045; G02B 5/0231; G02B 3/005; G02B 6/0025; G02B 27/0955; G02B 27/30; F21S 43/249; F21S 41/24; F21S 43/239; F21S 43/245; F21K 9/61; F21Y 2115/10
  See application file for complete search history.

(56) References Cited

U.S. PATENT DOCUMENTS

| | | | |
|---|---|---|---|
| 7,334,934 B2* | 2/2008 | Feng | G02B 6/0016 349/65 |
| 7,374,329 B2* | 5/2008 | Feng | G02B 6/0016 349/65 |
| 2002/0080598 A1* | 6/2002 | Parker | G02B 6/0021 362/616 |
| 2003/0034445 A1 | 2/2003 | Boyd et al. | |
| 2005/0024849 A1* | 2/2005 | Parker | F21V 5/00 362/600 |
| 2005/0147372 A1* | 7/2005 | Bourdelais | G01D 5/34723 385/129 |
| 2007/0070649 A1* | 3/2007 | Won | G02B 6/0036 362/620 |
| 2007/0091616 A1* | 4/2007 | Cassarly | G02B 5/021 362/341 |
| 2008/0137364 A1* | 6/2008 | Liu | G02B 6/0051 362/606 |
| 2008/0239753 A1* | 10/2008 | Parker | F21V 5/00 362/616 |
| 2008/0239755 A1* | 10/2008 | Parker | A61M 21/02 362/619 |
| 2008/0303777 A1* | 12/2008 | Inoue | G02B 3/0056 345/102 |
| 2008/0319715 A1* | 12/2008 | Kim | G02F 1/133615 703/1 |
| 2009/0147537 A1* | 6/2009 | Iwasaki | G02B 6/0021 362/620 |
| 2009/0153776 A1* | 6/2009 | Hsu | G02B 5/045 349/64 |
| 2009/0180297 A1* | 7/2009 | Shim | G02B 6/0038 362/606 |
| 2009/0268430 A1* | 10/2009 | Suzuki | G02B 5/0231 362/97.1 |
| 2010/0085735 A1* | 4/2010 | Kim | G02B 5/045 362/97.2 |
| 2010/0165603 A1* | 7/2010 | Sun | G02B 6/0053 362/97.2 |
| 2010/0220245 A1* | 9/2010 | Yang | G06F 3/0304 348/739 |
| 2011/0216267 A1* | 9/2011 | Miyamoto | F21V 7/22 349/62 |
| 2011/0242846 A1* | 10/2011 | Park | G02B 6/003 362/613 |
| 2012/0026430 A1* | 2/2012 | Chen | G02B 6/0016 349/65 |
| 2012/0113622 A1* | 5/2012 | Aronson | G02B 5/02 362/97.1 |
| 2012/0113680 A1* | 5/2012 | Nakai | G02B 6/0011 362/611 |
| 2012/0120344 A1* | 5/2012 | Kuroda | G02B 5/0231 349/62 |
| 2012/0147593 A1* | 6/2012 | Yapel | G02B 5/0221 362/97.1 |
| 2013/0057807 A1* | 3/2013 | Goto | G02B 6/0038 349/65 |
| 2013/0328090 A1* | 12/2013 | Park | H01L 33/60 257/98 |

* cited by examiner

OPTICAL MEMBER AND LIGHTING DEVICE USING THE SAME

CROSS-REFERENCE TO RELATED APPLICATION

This application claims priority to Korean Patent Application No. 10-2014-0013288, filed on Feb. 5, 2014, in the Korean Intellectual Property Office, the entire contents of which are hereby incorporated by reference.

BACKGROUND

1. Field

Embodiments of the present application relate to an optical member capable of implementing optical images having desired shapes through a pattern design, and a lighting device using the optical member.

2. Background

In general, a lighting device is a device used for lightening a dark place using various light sources. The lighting device is used to shine a beam to a specific object or space and to express an atmosphere of the specific object or space in a desired shape or color.

According to the technical development of an LED (Light Emitting Diode), lighting devices in various shapes using the LED have recently come into wide use. For example, one of the lighting devices according to a conventional art includes a diffusion plate for emitting light emitted from an LED light source to the outside.

Most of the LED lighting devices according to the conventional art are configured so that light is uniformly outputted on an entire light emitting surface. Also, in order to express the atmosphere of a specific object or space in a desired shape or color, a color filter or a filter having a light permeable hole in a desired shape has been used in some lighting devices according to the conventional art.

However, when the atmosphere of a specific object or space is expressed in a desired shape or color using the LED lighting devices according to the conventional art, the configuration of the devices becomes mechanically complicated, and as a result, it is problematic in that the degree of freedom in design is limited, and it is difficult to install or maintain and manage the devices. As such, in order to express the atmosphere in a desired shape or color or an optical image, a light device having a simple structure, which is easy to install or operate, has been required.

BRIEF DESCRIPTION OF THE DRAWINGS

The embodiments will be described in detail with reference to the following drawings in which like reference numerals refer to like elements wherein.

DETAILED DESCRIPTION

Figure 1:
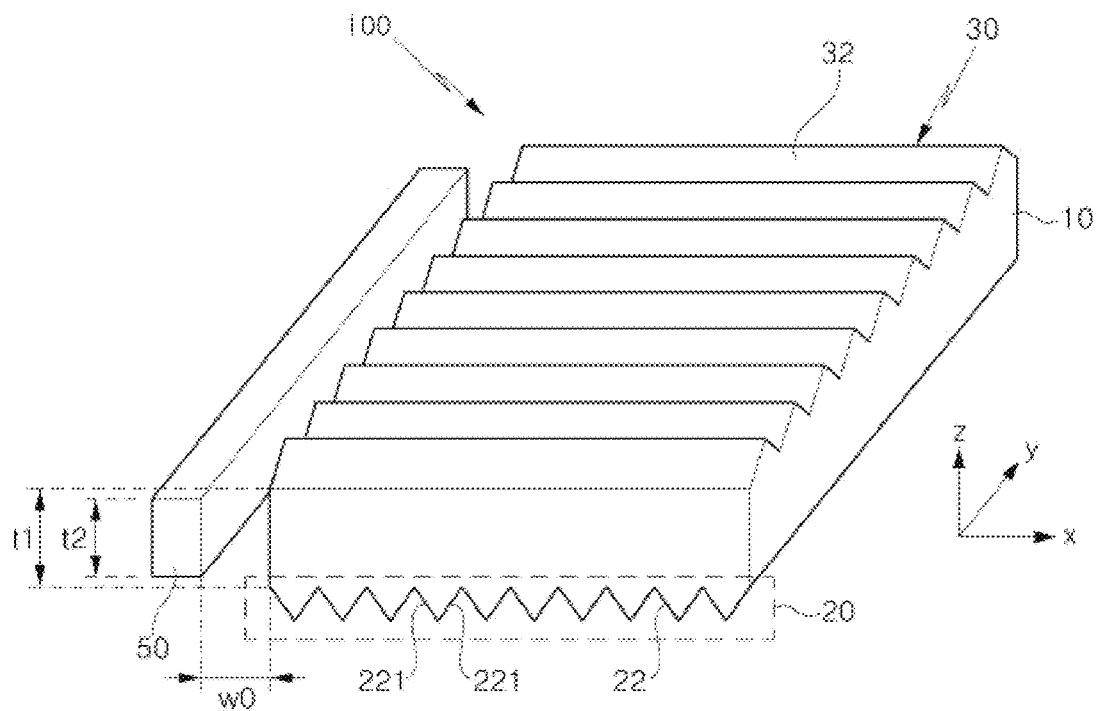
FIG. 1 is a perspective view of a lighting device using an optical member according to an embodiment of the present application.

Hereinafter, the embodiments of the present application that an ordinary person skilled in the art can implement will be described with reference to the accompanying drawings. The embodiments in the specification and the constructions shown in the drawings are provided as a preferred embodiment of the present application, and it should be understood that there may be various equivalents and modifications which could substitute at the time of filing. In addition, when it comes to the operation principle of the preferred embodiments of the present application, when the known functions or functions are seemed to make unclear the subject matters of the present application, they will be omitted from the descriptions of the invention. The terms below are defined in consideration of the functions of the present application, and the meaning of each term should be interpreted by judging the whole parts of the present specification, and the elements having the similar functions and operations of the drawings are given the same reference numerals. As used herein, the singular forms are intended to include the plural forms as well, unless the context clearly indicates otherwise.

FIG. 1 is a perspective view of a lighting device using an optical member according to an embodiment of the present application.

Referring to FIG. 1, a lighting device 100 according to the present embodiment includes: a light guide portion 10; a three-dimensional effect forming portion 20; a multi-effect forming portion 30; and a light source portion 50.

The lighting device 100 may have an optical member having patterns extending in different directions from both sides of the light guide portion 10, and the light source portion 10 for irradiating light to one side of the optical member. In this case, the optical member includes: the light guide portion 10 configured for guiding an incident beam incident to the inside from one side to another side, and the three-dimensional effect forming portion 20 and multi-effect forming portion 30 provided on both sides of the both sides of the light guide portion and having a pattern structure in which a part of each of the both sides is removed.

The light guide portion 10 has the form of a plate or film made of a transparent material and guides an incident beam supplied from the light source portion 50 from one side to another side via internal reflection. The light guide portion 10 supports the three-dimensional effect forming portion 20 provided on a first surface as a base substrate and the multi-effect forming portion 30 provided on a second surface opposite to the first surface.

The three-dimensional effect forming portion 20 includes main patterns (22) provided on the first surface of the light guide portion 10. The main patterns 22 have a shape in which a part of the first surface of the light guide portion 10 is removed, namely, a stripe shape resulting from convex portions in a ridge-like shape or concave portions in a ditch-like shape, the convex portions and the concave portions being alternately arranged. The convex portions or the concave portions of the main patterns 22 may be unit patterns. When a pattern extension direction of each unit pattern is a first direction or a y-direction, the main patterns 22 are sequentially arranged in a second direction or an x-direction. Also, the respective main patterns 22 have respective inclined surface 221 with each inclined angle with respect to the first surface.

The three-dimensional effect forming portion 20 enables the main patterns to guide an incident beam into a first surface direction toward which the first surface looks, or a second surface direction toward which the second surface looks by refraction and reflection from the inclined surfaces of the main patterns 22, thereby creating a line-shaped beam having a three-dimensional effect or a perceptional depth effect in a first path crossing at right angles to each pattern extension direction of the main patterns 22.

The multi-effect forming portion 30 is disposed to have a lamination structure with the three-dimensional effect forming portion 20. In the present embodiment, the multi-effect forming portion 30 is provided in a form in which a part of the second surface opposite to the first surface of the light guide portion 10. Such a lamination structure of the three-dimensional effect forming portion 20 and the multi-effect forming portion 30 is implemented by a structure in which the three-dimensional effect forming portion and the multi-effect forming portion are integrally formed with both sides of the light guide portion 10, but is not limited thereto.

The multi-effect forming portion 30 has optical patterns 32 arranged on the second surface of the light guide portion 10. The optical patterns 32 has a stripe shape resulting from convex portions in a ridge-like shape or concave portions in a ditch-like shape, the convex portions and the concave portions being alternately arranged. The convex portions or the concave portions of the optical patterns 32 may be unit patterns. When a pattern extension direction of each unit pattern of the optical pattern 32 may be a direction which crosses the respective pattern extension directions of the main patterns or crosses at right angles to the respective pattern extension directions. When the respective pattern extension directions of the unit patterns of the optical patterns are identical to each other, for example, the respective pattern extension directions of the optical patterns 32 are an x-direction, the patterns of the optical patterns 32 are sequentially arranged in the first direction or the y-direction.

Figure 16:
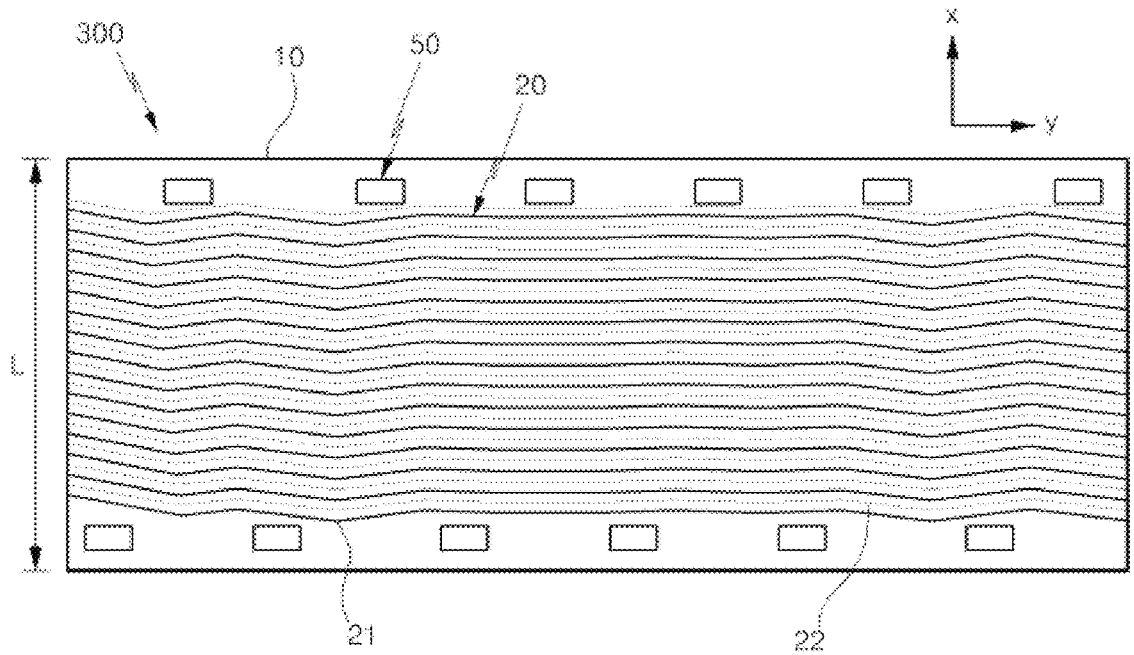
FIG. 16 is a plan view showing a structure of the lighting device of FIG. 14 in which a multi-effect forming portion is omitted.
Figure 23:
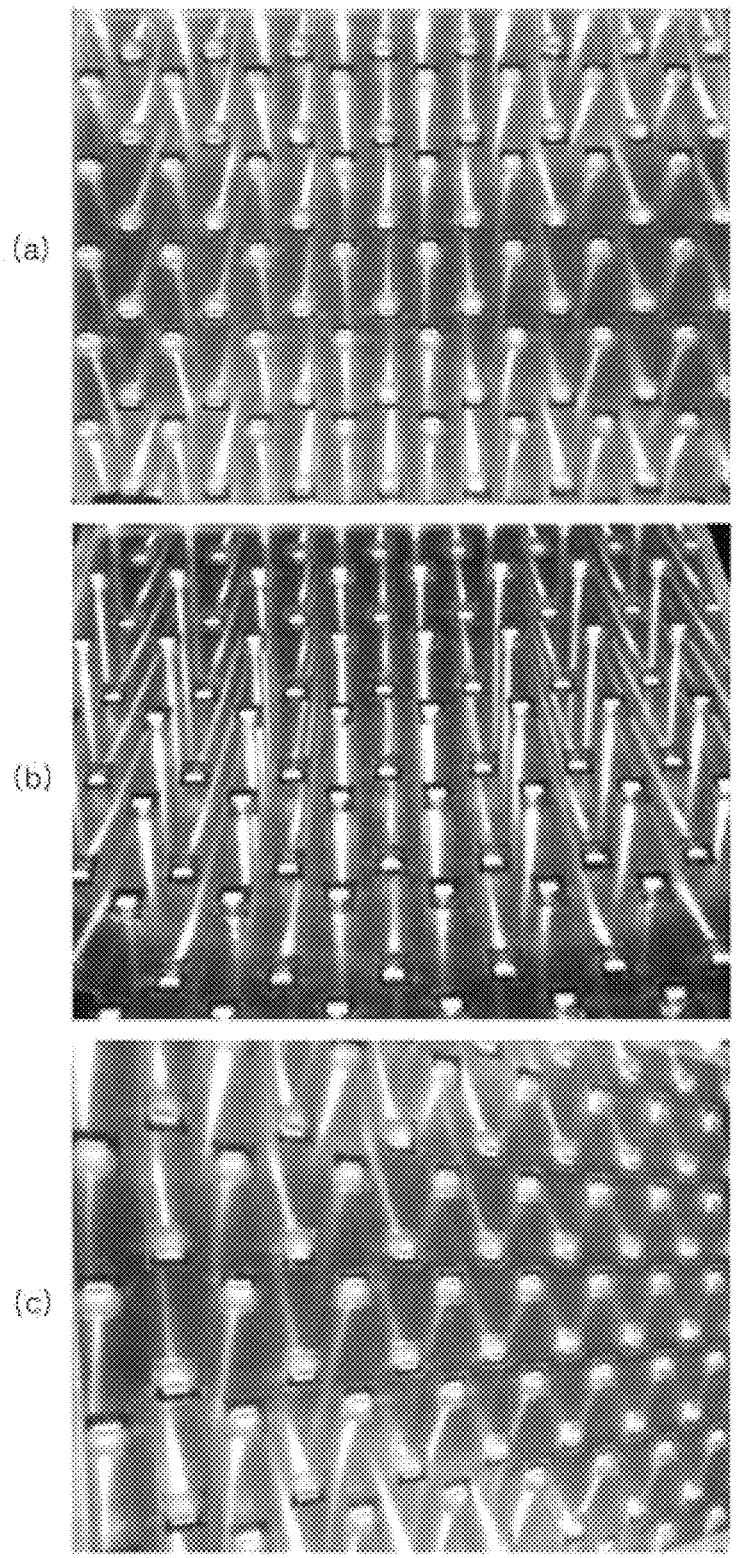
FIG. 23 is a view showing an operational state of the lighting device of FIG. 21.

The multi-effect forming portion 30 enables single line-shaped beams of a first optical path formed by the main patterns 22 to be converted into multiple line-shaped beams via the optical patterns 32 (see FIGS. 16 and 23). That is, the optical patterns 32 create first line-shaped beams traveling to the right of the single-line-shaped beams and second line-shaped beams traveling to the left of the single line-shaped beam by dividing the single line-shaped beam emitted from the main patterns 22.

In the present embodiment, the light guide portion 10 may be made of resin or glass. When the light guide portion 10 is formed as a resin layer, the resin layer may be formed using a thermoplastic polymer or a photo curable polymer. Also, in the case of the resin layer, examples of the material of the light guide portion 10 may include PC (Polycarbonate), PMMA (Polymethylmethacrylate), PS (Polystyrene), PET (Polyethylene terephthalate) and so on.

The light guide portion 10 may have a thickness t1 of about 0.1 mm or more and about 10.0 mm or less. When the thickness t1 of the light guide portion 10 is smaller than 0.1 mm and an LED element is used as a light source of the light source portion 50, the height of a light emitting surface of an LED element should be produced smaller than about 100 μm. Thus, difficulty in production may be generated and costs may be increased. Also, when the thickness t1 of the light guide portion 10 is larger than 10.0 mm, a thickness and a weight of the lighting device 100 may be increased and material costs may be also increased.

Also, the light guide portion 10 may have a thickness t1 of about 100 μm or more and about 250 μm or less. In this case, the light guide portion 10 may have flexibility for enabling the light guide portion to be appropriately wound on a roll device or the like. Also, according to some embodiments, the thickness t1 of the light guide portion 10 may be in the range of about 250 μm or more and about 10.0 mm or less. In this case, since it is difficult to wind the light guide portion 10 on a roll device, the light guide portion may have a plate form and may be applied to an application product in such a form.

The light source portion 50 creates an incident beam inside the light guide portion 10 by irradiating light to one side of the light guide portion 10. The incident beam may move to be induced to another side via internal total reflection from the one side of the light guide portion 10.

The light source portion 50 may include at least one light source using an LED (Light Emitting Diode) element. The LED light source may be provided as at least one LED package including one or a plurality LED elements. When the LED light source is used, the light source portion 50 may have a light emitting surface having a predetermined area according to the number or size of LED chips.

The light source portion 50 may be arranged to be separated from one side of the light guide portion 10 by a predetermined distance w0. In this case, a separation space therebetween may be filled with a transparent material such as resin and so on. Of course, according to some embodiments, the light source portion 50 may be configured to be closely attached to one side of the light guide portion 10 without a separation space or may be configured to be buried in an inner side of the light guide portion 10.

A light emitting surface of the light source may be arranged to face the one side of the light source portion 10 and may have a circular shape, an elliptical shape, a triangular shape, a quadrangular shape, a pentagonal shape or a polygonal shape. In this case, regardless of the shape of a cross section, a height of the light emitting surface may be defined as a maximum length in a thickness direction of the light guide portion 10, and a width of the light emitting surface may be defined as a maximum length in a direction that crosses at right angles to a thickness direction in the side of the light guide portion 10a and is parallel to the light emitting surface.

A height t2 of the light source portion 50 is identical to or is smaller than a thickness t1 of the light guide portion 10. This is intended to create the incident beam inside the light guide portion 10 when light emitted from the light emitting surface of the light source of the light source portion 50 is irradiated to a side of the light guide portion 10. With regard to the light source portion 50, when the height t2 of the light source is larger than the thickness t1 of the light guide portion 10, the light of the light source portion 50 may not properly enter the light guide portion 10.

According to the present embodiment, it can be provided with the lighting device in which the single line-shaped beam having a three-dimensional effect are implemented via the three-dimensional effect forming portion 20, and the single line-shaped beam is converted into the multiple line-shaped beams, and an optical member used in the lighting device.

Figure 2:
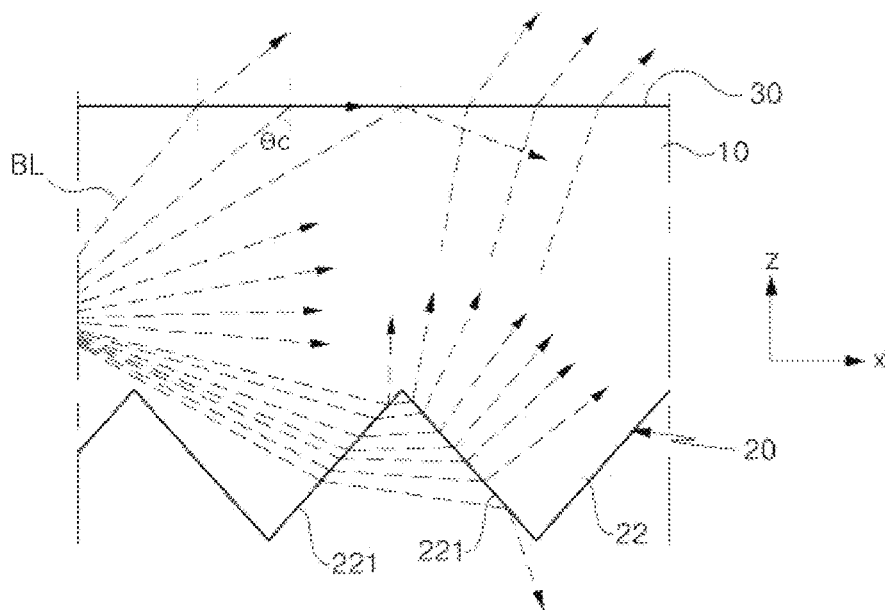
FIG. 2 is an enlarged cross-sectional view showing a part of the optical member of FIG. 1.

FIG. 2 is an enlarged cross-sectional view showing a part of the optical member of FIG. 1.

Referring to FIG. 2, the incident beam BL inside the light guide portion 10 is basically completely reflected inside the light guide portion 10 and moves from one side of the light guide portion 10 to another side. When the incident beam BL meets the inclined surfaces 221 of the main patterns 22, the incident beam is refracted or reflected from the inclined surfaces 221 of the main patterns 22 so that a traveling direction of the incident beam BL is changed to a thickness direction (z-direction) of the light guide portion 10.

That is, when an incidence angle of the incident beam bumped against the inside of an external surface inside the light guide portion 10 is smaller than a predetermined critical angle θc, the incident beam is refracted according to a difference in refractive index while passing through an internal surface. When the incidence angle is greater than the critical angle θc, the incident beam is reflected from the inside of the light guide portion 10. Accordingly, when the incident beam meets the main patterns 22 extending to cross at right angles to a traveling direction of the incident beam and sequentially arranged along the traveling direction of the incident beam, the incident beam may travel in the first surface direction or the second surface direction of the light guide portion 10 by refraction and reflection.

The critical angle θc refers to an incidence angle at a first medium having a refraction angle of 90° at a second medium when light travels from the first medium of a first refractive index n1 to the second medium of a second refractive index. A relation between the reflective index and the critical angle is represented by following Equations 1 and 2.

$$n = \frac{n1}{n2}$$ [Equation 1]
$$= \frac{\sin\theta_c}{\sin 90°}$$

$$\sin\theta_c = \frac{n1}{n2}$$ [Equation 2]

In Equation 2, when n1 is a reflective index of air, and n2 is a reflective index of the light guide portion 10, the reflective index of the air becomes about 1. Thus, a reflective index of the critical angle and the medium may be represented by following Equation 3.

$$\sin\theta_c = \frac{n1}{n2}$$ [Equation 3]

A thickness of the light guide portion 10 may be determined in consideration of a critical angle θc resulting from a refractive index of Equation 3 with regard to the optical member according to the present embodiment and the lighting device using the optical member.

In order for the incident beam inside the light guide portion 10 to be appropriately refracted or reflected from the main patterns 22, each inclined surface 221 of the main patterns of the optical member according to the present embodiment is designed to have a predetermined surface roughness.

The inclined surface 221 may be a mirror-like finishing surface or a precision processing surface. For example, with regard to the surface roughness of the inclined surface 221, even though there is a slight difference according to each processing method, a center line average roughness or an arithmetic mean roughness Ra may be about 0.02 or less, and a maximum height roughness Rmax may be about 0.3. Also, with regard to the surface roughness of the inclined surface 221, a ten point median height Rz may be designed in the range of 0.8 or less. Here, the unit of roughness may be μm, and a standard length may be 0.25 mm.

The surface roughness of the inclined surface 221 is intended to secure a light reflectance of the inclined surface 221 in a range beyond a predetermined value. When the surface roughness shows a larger surface roughness than the value described above, it is difficult to properly implement a line-shaped beam due to the scattering of light or light beyond a fixed amount returning from the inclined surface 221 to the light source.

According to the present embodiment, a line-shaped beam or a line-shaped beam with a three-dimensional effect of the optical path crossing at right angles to the pattern extension directions of the main patterns 2 may be implemented by controlling a refraction and reflection ability of the inclined surfaces 221 of the multiple patterns 22 through a pattern design for the main patterns 22 of the three-dimensional effect forming portion 20. That is, the light passing along the main patterns 22 of the three-dimensional effect forming portion 20 may be converted into a line-shaped beam limited to the first optical path and specific optical width by the respective pattern extension directions of the main patterns while sequentially traveling in the first surface direction or in the second surface direction by refraction or reflection from the inclined surfaces 221 according to a pattern design. This line-shaped beam may be mentioned as a three-dimensional effect beam or a line-shaped beam with a three-dimensional effect.

Figure 3:
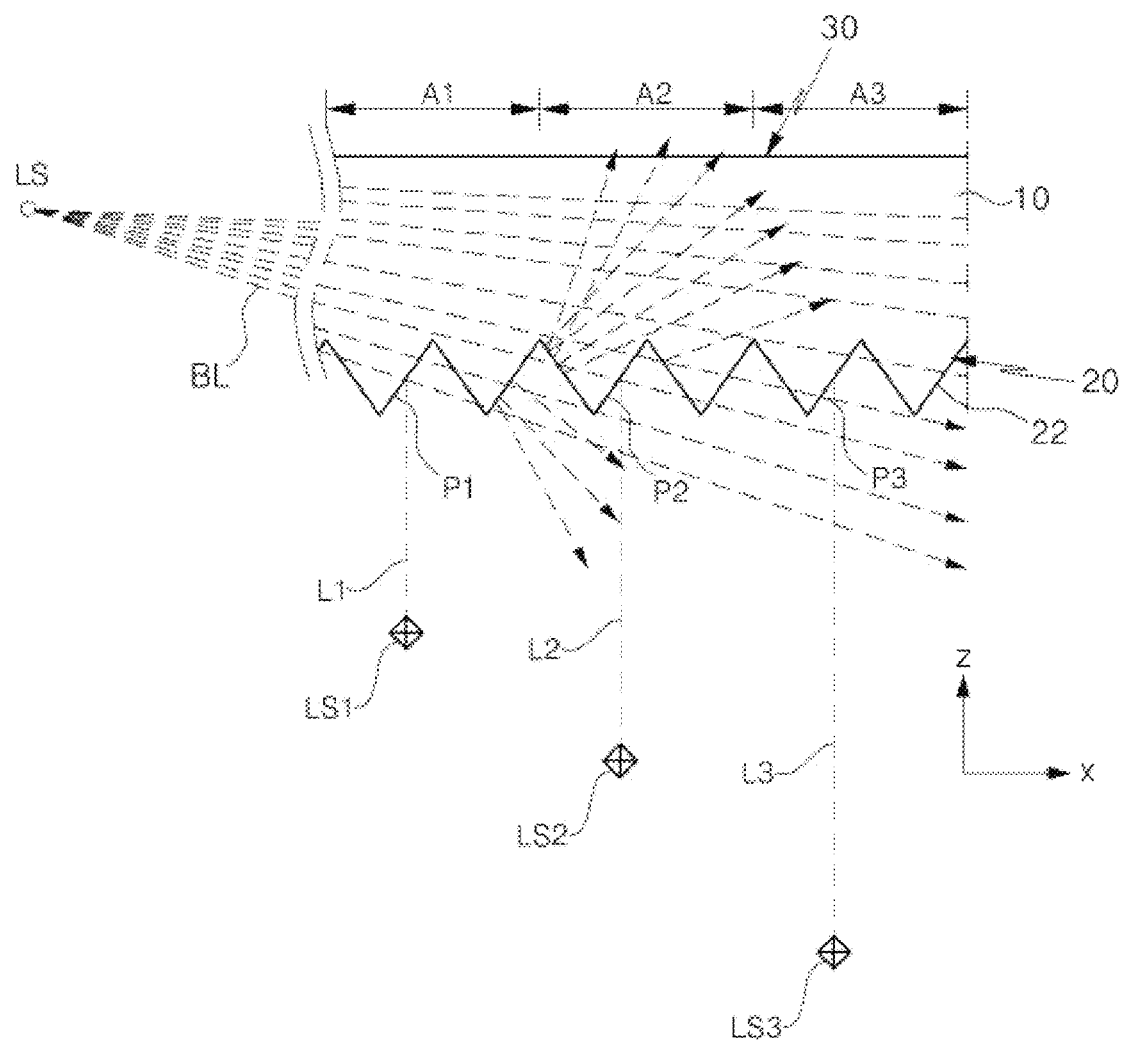
FIG. 3 is an enlarged cross-sectional view showing another part of the optical member of FIG. 1.

FIG. 3 is an enlarged cross-sectional view showing another part of the optical member of FIG. 1.

Referring to FIG. 3, the incident beam BL incident to the inside of the light guide portion 10 is basically completely reflected in the inside of the light guide portion 10. Furthermore, when the incident beam BL meets the main patterns 22, the incident beam BL travels to the outside of the light guide portion 10 by refraction and reflection from the main patterns 22.

In such a case, the main patterns 22 sequentially arranged from the first of the light guide portion 10 in the first direction (x-direction) serve as indirect light sources in which optical paths increase gradually according to a distance from the light source LS by refracting or reflecting the incident beam via the inclined surfaces of the respective patterns (main unit patterns) and emitting the incident beam into the first surface direction or the second surface direction. That is, the main patterns 22 serve as dummy light sources LS1, LS2, LS3 located far away from a predetermined standard point d as a distance of the light source LS increases when viewed from the standard point or an observing point (a point where an observer such as a user, a camera or the like is located) of the outside of the light guide portion 10.

For example, among the main patterns 22 sequentially arranged in one direction based on the light source LS, is assumed that the main patterns include first main patterns P1 of a first area A1, second main patterns P2 of a second area A2, and third main patterns P3 of a third area A3. At this time, a second optical path from the light source LS to the second main patterns P2 corresponding to a moving distance of the incident beam BL reaching the second main patterns P2 from the light source LS is longer than a first optical path from the light source LS to the first main patterns P1 and is shorter than a third optical path from the light source LS to the third main patterns P3. That is, the second main patterns P2 or a second distance L2 with the inclined surfaces of the second main patterns in a second dummy light source LS2 of the light source LS is longer than a first distance L1 with the inclined surfaces of the first main patterns P1 in a first dummy light source LS1 of the light source LS and is shorter than a third distance L3 with the inclined surfaces of the third main patterns P3 in a third dummy light source LS3. Here, the first distance L1, the second distance L2 and the third distance L3 correspond to the optical paths from the light source to the respect main patterns P1, P2, P3. As such, the main patterns 22 may create the dummy light sources, which are configured such that a distance increases gradually or luminance reduces gradually according to a traveling direction of the incident beam as viewed from a standard point, on patterns of the optical paths.

According to the present embodiment, the main patterns 22 may create the dummy light source having a long optical path according to an increase in a distance from the light source in the traveling direction of the incident beam. Thus, a line-shaped beam having a three-dimensional effect may be implemented by an effect of the dummy light source located far away an arbitrary standard point or observing point.

The line-shaped beam having the three-dimensional effect may refer to an optical image having a sense of distance or a perceptional depth, which is configured such that a line-shaped beam concentrated into a predetermined optical path (the first path) by a pattern design gradually enters the light guide portion 10, namely, from the first surface of the light guide portion 10 toward the second surface of the light guide portion 10, as viewed from the first surface direction or the second surface direction. Furthermore, the line-shaped beam having the three-dimensional effect or the three-dimensional effect beam may be one example of a line shaped beam and may be another name for a specific optical image of the line shaped beam.

Meanwhile, with regard to the first to third main patterns (P1, P2 and P3) of the main patterns, the second main patterns P2 may be patterns located right after the first main patterns P1 on the first surface of the light guide portion 10 as viewed from the light source, or may be patterns located between the first main patterns P1 and the other main patterns in a predetermined number. Similarly, the third main patterns P3 may be patterns located right after the second main patterns P2 as viewed from the light source, or may be patterns located between the second main patterns P2 and the other main patterns in a predetermined number.

Figure 4:
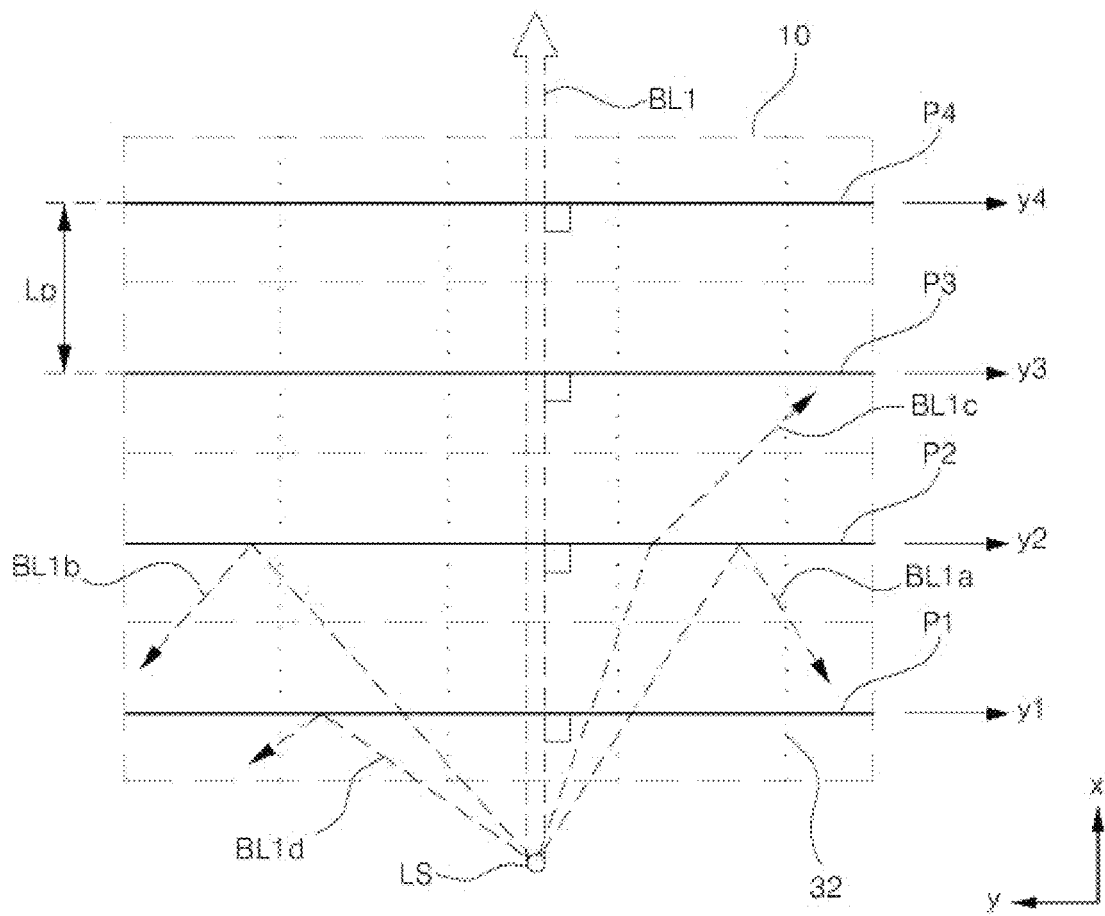
FIG. 4 is a view illustrated for explaining a generation principle of a line-shaped beam of the optical member of FIG. 1.

FIG. 4 is a view illustrated for explaining a generation principle of a line-shaped beam of the optical member of FIG. 1. FIG. 4 corresponds to a partially enlarged plan view showing a case in which the optical member of the lighting device of FIG. 1 is placed on a plane so that the main patterns of the light guide portion are exposed to an upper part.

Referring to FIG. 4, with regard to the optical member of the lighting device according to the present embodiment, when the main patterns 2 are designed to extend from the first surface of the light guide portion 10 in the y-direction and to be sequentially arranged in the x-direction, the most of incident beams (a first incident beam) of the light source LS become line-shaped beams BL1 traveling to the first optical path (x-direction) that crosses at right angles to the respective pattern extension directions y1, y2, y3, y4 of the main patterns P1, P2, P3, P4.

Also, with regard to implementation of the line-shaped beam, the main patterns P1, P2, P3, P4 may guide a part of the incident beams (a second incident beam) by refraction or reflection from the inclined surfaces into a direction except for the first optical path. Here, among beams toward the inclined surfaces from the light source, the second incident beams refer to beams traveling in a slope direction between roughly a +x-direction and a +y-direction and a slope direction between the +x-direction and a −y direction based on the +x-direction of the first optical path BL1 on the plane defined by each pattern extension direction of the main patterns and the x-direction. That is, the second incident beams BL1a, BL1b, BL1c, BL1d refer to beams (hereinafter referred to as 'the ambient beams') that are scattered by being refracted or reflected by the inclined surfaces when the beams meet the inclined surfaces of the main patterns P1 to P4. Since the second incident beams BL2, BL3, LB4, LB5 are reflected or refracted from the inclined surfaces of the main patterns to be dispersed in the light guide portion 10 in a relatively wide range, as viewed from an arbitrary point (standard point, observing point and so on) on a straight line which crosses an x-y plane (corresponding to the first surface or the second surface of the light guide portion), the second incident beams become ambient beams BL1a, BL1b, BL1c, BL1d that form a peripheral portion or a dark space of the periphery of the line shaped beam that is clearly distinguished due to relatively low luminance compared to a line shaped beam portion (hereinafter referred to as 'a bright portion') resulting from the first incident beams.

According to the present embodiment, the respective pattern extension directions (y1 to y4) of the main patterns (P1 to P4) may be the extension directions of specific straight lines on each inclined surface of the main patterns or may be extension directions of specific contact lines in contact with curved lines on the inclined surfaces.

That is, when the respective pattern extension directions P1, P2, P, P4 of the main patterns P1 to P4 are designed to be parallel to each other, the optical path (the first optical path) of the incident beams passing along the main patterns has a straight line form in which the light starts from the main patterns P1 which first meets the beam of the light source and travels in directions crossing at right angles to the respective pattern extension directions y1, y2, y3, y4. This is because movement of the light is concentrated to an optical path of the main patterns that can be traversed in the least time according to the Fermat's principle that 'a ray of light passing along a medium travels along a movement path that can be traversed in the least time.'

Also, with regard to the design of the main patterns, a distance Lp between two adjacent main patterns may range from about 10 to 500 μm. This distance Lp may correspond to a pitch or an average distance of the main patterns. This distance Lp is based on a minimum distance and a maximum distance for implementing a line shaped beam or a three-dimensional effect beam. When the distance is beyond the range, it may be difficult to implement the line shaped beam or the three-dimensional effect beam because it is difficult to implement indirect light sources sequentially arranged on the optical path.

When the main patterns are designed such that the respective pattern extension directions cross each other from at least one point or to extend in a roughly radial direction so as not to be parallel to each other (see FIG. 6), according to the Fermat's principle, the optical path of the incident beams passing along the main patterns may have a curved line form in which the beam starts from the main patterns which first meet the incident beams and is bent to a side in which a distance between two adjacent main patterns reduces gradually.

As described above, with regard to the optical member of the present embodiment, the line-shaped beams generated by the main patterns may be implemented to be limited to a desired shape via a pattern design controlling pattern conditions such as a main pattern structure, a distance between two adjacent main patterns and so on. For example, a specific optical path and a specific optical width may be implemented to extend to the extent of a first length while having a fixed optical width according to the main pattern design, may be implemented to extend to the extent of a second length shorter than the first length while having an optical width which reduces gradually, or may be implemented to be similar to the first length or to be shorter or longer than the first length while having an optical width which increases gradually.

Figure 5:
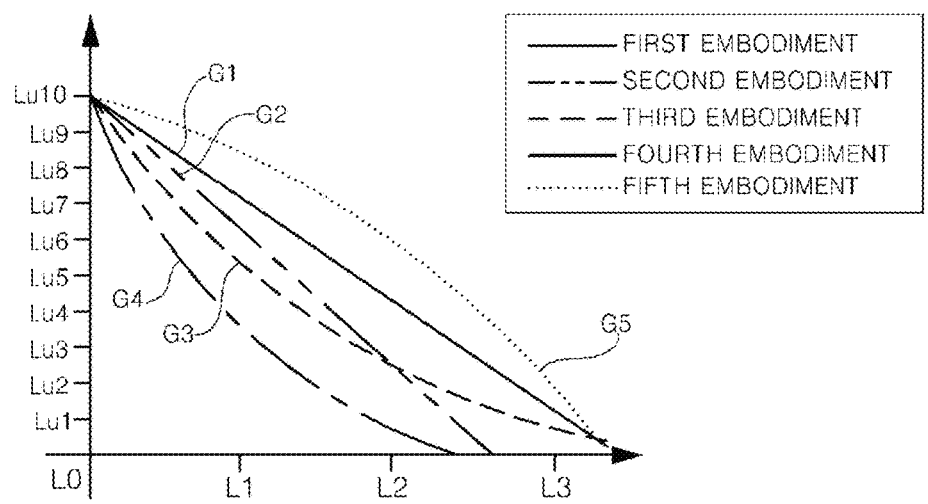
FIG. 5 is a view showing luminance for each area regarding a line-shaped beam of the optical member of FIG. 1.

FIG. 5 is a view showing luminance for each area regarding a line-shaped beam of the optical member of FIG. 1.

Referring to FIG. 5, the main patterns of the optical member according to the present embodiment create line-shaped beams of the first optical path by reflecting or refracting the incident beams while limiting the incident beams to the first optical path and by emitting the incident beams to the outside of the light guide portion.

Explaining the line-shaped beam in further detail, when the main patterns including multiple patterns sequentially arranged with regard to the light source are divided into at least one main pattern belonging to three areas (see A1, A2 and A3 of FIG. 3), luminance values by reflection and refraction of the main patterns in each area refer to luminance values having different levels according to a distance from the light source.

That is, when the main patterns are divided into the first main patterns of the first area A1, the second main patterns of the second area A2 and the third main patterns of the third area A3 (see FIG. 3), a second luminance of the second main patterns is lower than a first luminance of the first main patterns and is higher than a third luminance of the third main patterns. Here, a second distance L2 between the light source and the main pattern located farthest away from the light source among the second main patterns is longer than a first distance L1 between the light source and the main pattern located farthest away from the light source among the first main patterns and is shorter than a third distance L3 between the light source and the main pattern located farthest away from the light source among the third main patterns.

For example, when a maximum luminance value of the closest main pattern to the light source is level 10 Lu10, the specific first main pattern positioned at the first distance L1 from the light source may have a luminance value of about level 8 Lu8, level 7 Lu7, level 6 Lu6, level 5 Lu5 or level 4 Lu4 according to different pattern structures of the first to fifth embodiment. The specific second main pattern positioned at the second distance L2 from the light source may have a luminance value of about level 6 Lu6, level 4 Lu4, level 2 Lu2, or level 1 Lu1 according to pattern designs. Furthermore, the specific third main pattern positioned at the third distance L3 from the light source may have a luminance value of about level 2 Lu2, level 1 Lu1, or level 0 (no luminance).

That is, with regard to the main patterns 22 of the optical member 100 which has been previously described with reference to FIGS. 1 to 4, the main patterns emit incident beams through refraction or reflection from the inclined surfaces to the outside of the light guide portion 10. According to this principle, the sequentially arranged patterns of the main patterns 22 serve as indirect light sources having different luminous intensity values that reduce gradually according to a pattern design or an arrangement structure, thereby creating line-shaped beams in which an optical path increase gradually and luminous reduces gradually.

Referring to FIG. 5 again, as shown in a luminance curve G1 of a first embodiment, according to a predetermined main pattern design of the first embodiment, the first patterns, the second patterns and the third patterns serve as indirect light sources having luminance values of about level 7, level 4 and level 1, respectively. According to this configuration, the multiple main patterns may implement three-dimensional effect beams in which a luminance value of the multiple main patterns is substantially regularly reduced as a distance from the light sources increases gradually. In order to implement the three-dimensional effect beams, the multiple patterns may be designed in a fixed pitch.

Also, according to a pattern design of a second embodiment, as shown in a luminance curve G2 of the second embodiment, the first patterns, the second patterns and the third patterns serve as indirect light sources having respective luminance values of about level 6, level 3, and level 0. According to such a configuration, the main patterns may implement three-dimensional effect beams in which luminance is substantially regularly reduced at the main patterns according to an increase in a distance from the light source.

In order to implement the three-dimensional effect beams, the main patterns may be designed so that a pitch can reduce or a pattern design per a unit length can increase at a fixed rate as a distance from the light source increases gradually.

Also, according to a pattern design of a third embodiment, as shown in a luminance curve G3 of the third embodiment, the first patterns, the second patterns and the third patterns serve as indirect light sources having respective luminance values of about level 5, level 2, and level 1. According to such a configuration, the main patterns may implement three-dimensional effect beams in which a luminance reduction rate between the first area A1 and the second area A2 is larger than a luminance reduction rate between the second area A2 and the third area A3 as a distance from the light source increases gradually. In order to implement the three-dimensional effect beams, the multiple main patterns may be designed in a fixed pitch which is narrower than the pitch of the first embodiment, or may be designed such that a pitch increases gradually according to an increase in a distance from the light source.

Also, according to a pattern design of a fourth embodiment, as shown in a luminance curve G4 of the fourth embodiment, the first patterns, the second patterns and the third patterns serve as indirect light sources having respective luminance values of about level 4, level 1, and level 0. According to such a configuration, the main patterns may implement three-dimensional effect beams in which luminance is further rapidly reduced relatively compared to the case of the third embodiment. In order to implement the three-dimensional effect beams, the multiple main patterns may be designed in a fixed pitch narrower than the pitch of the third embodiment, or may be designed such that a pitch reduces gradually according to an increase in a distance from the light sources.

Also, according to a pattern design of a fifth embodiment, as shown in a luminance curve G5 of the fifth embodiment, the first patterns, the second patterns and the third patterns serve as indirect light sources having respective luminance values of about level 8, level 6, and level 2. According to such a configuration, the main patterns may implement three-dimensional effect beams in which a luminance reduction rate between the first area A1 and the second area A2 is smaller than a luminance reduction rate between the second area A2 and the third area A3 as a distance from the light source increases gradually. In order to implement the three-dimensional effect beams, the multiple main patterns may be designed in a fixed pitch which is wider than the pitch of the first embodiment, or may be designed in such a manner that a pitch reduces gradually according to an increase in the distance from the light source.

In the aforesaid first to five embodiments, it is assumed that the respective embodiments are identical to each other with respect to the main pattern structures and reflection abilities of the inclined surfaces of the respective main patterns. When there is a difference in the pattern structures and the reflection abilities among the patterns, by adjusting a pattern design in consideration of this fact, three-dimensional effect beams having luminance which is naturally reduced may be obtained by the indirect light source effects of the multiple main patterns sequentially arranged.

According to the present embodiment, thanks to the effect of the reduction in luminance and the effect of the indirect light sources of the multiple main patterns resulting from a difference in the distances from the light sources, namely, a difference in optical paths, the line-shaped beams, or the line-shaped beams with a three-dimensional effect can be implemented.

Figure 6:
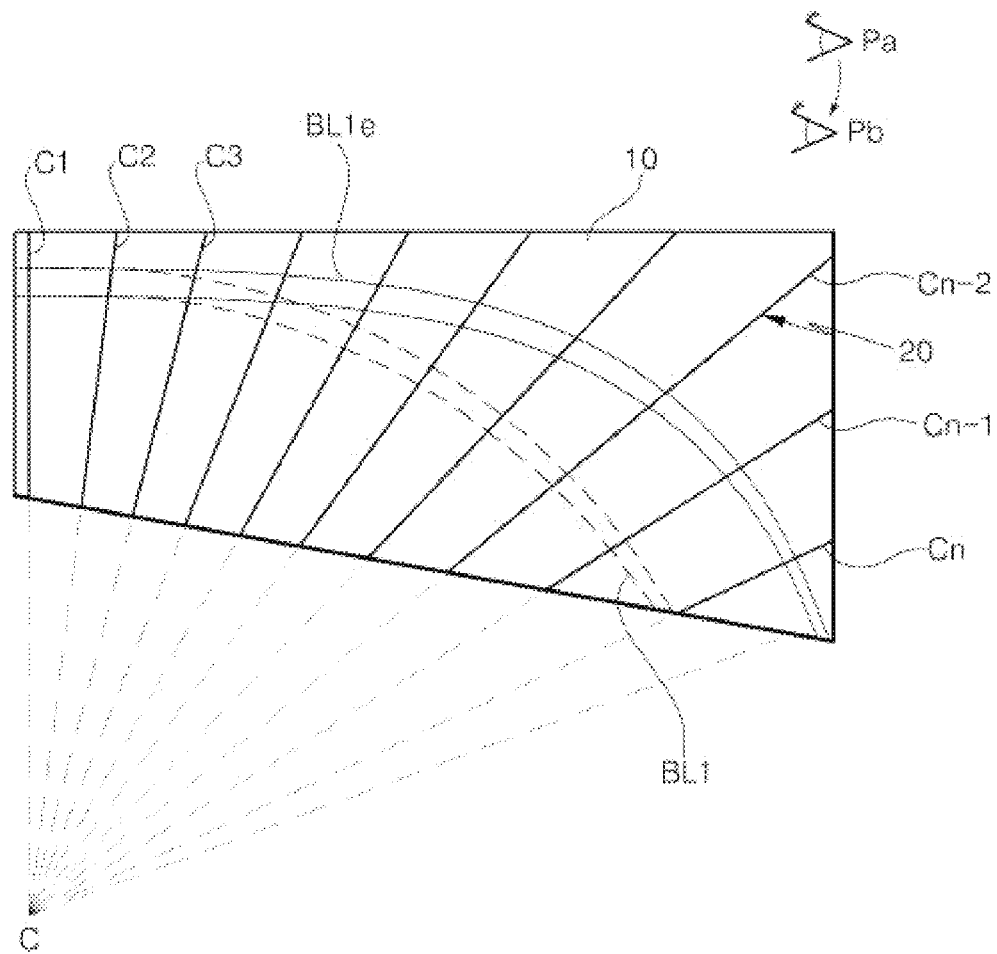
FIG. 6 is a plan view showing an optical member of another embodiment of the present application.

FIG. 6 is a plan view showing an optical member of another embodiment of the present application;

Referring to FIG. 6, the optical member according to the present embodiment is configured to include multiple main patterns provided in a structure in which pattern arrangement directions cross each other from the first surface of the light guide portion 10. The multiple main patterns include a first main pattern C1, a second main pattern C2, a third main pattern C3, an n-second main pattern Cn−2, an n-first main pattern, and an $n^{th}$ main pattern Cn in order of the location nearest to the light source. Here, n is a natural number of 6 or more.

In the present embodiment, the multiple main patterns are arranged to extend in directions which are not parallel to each other. That is, virtual extension lines of the respective pattern extension directions of the multiple main patterns may meet at one point of intersection C.

When an incident beam of the light source passes along the three-dimensional effect forming portion 20, the multiple main patterns may implement a line-shaped beam BL1 of the first optical path which is bent with a curvature to a side in which the pattern extension directions cross each other, namely, a side near to an intersecting point C with a narrow distance between adjacent main patterns. This is because the light travels along a direction meeting at right angles to each of the pattern extension direction of the multiple main patterns according to the Fermat's principle that 'a ray of light traveling in a medium travels along a movement path that can be traversed in the least time.'

Meanwhile, with regard to the optical member of the present embodiment, when an observing point or a fixed standard point of an observer (a person, a camera or the like) who observes the line-shaped beam BL1 of the first optical path in the first surface direction or the second surface direction is moved from a first point Pa to a second point Pb, as viewed from the second point Pb, the line-shaped beam by the multiple main patterns is displayed as a line-shaped beam LB1e traveling along a different optical path instead of the first optical path. This is because the position of the first optical path meeting at right angles to the pattern extension directions of the multiple main patterns is moved to a direction opposite to the movement direction of the standard point according to the movement of the standard point or the observing point.

According to the present embodiment, line-shaped beams may be implemented by designing the main patterns according to desired optical images and line-shaped beams having various optical images (a straight line form, a curved line form or a combination form thereof) expressed in the different optical path according to the movement of the standard point or the observing point may be implemented. Moreover, even though it is not illustrated for the convenience of description, the multi-effect forming portion 20 (see reference numeral 30 of FIG. 1) disposed in a lamination structure with the three-dimensional effect forming portion 20 is used so that single line-shaped beams can be converted into multiple line-shaped beams, thereby implementing various optical images.

Meanwhile, even though it is not illustrated in the drawings, the optical images expressed in the different optical path according to the movement of the standard point or the observing point may be also implemented from the main patterns having pattern extension directions parallel to each other as the main patterns of FIG. 4.

Figure 7:
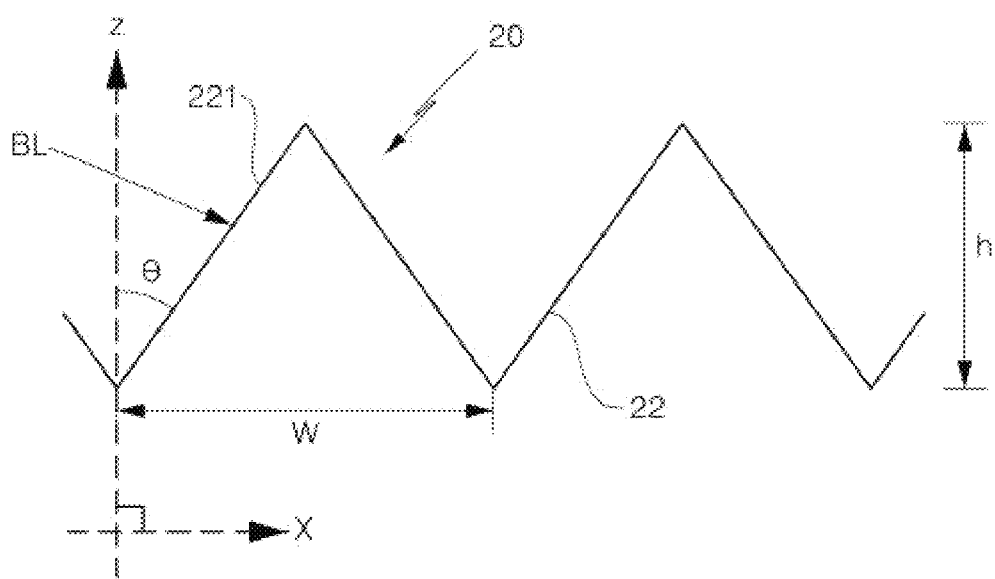
FIG. 7 is a partially enlarged cross-sectional view showing main patterns of the optical member of FIG. 1.

FIG. 7 is a partially enlarged cross-sectional view showing main patterns of the optical member of FIG. 1;

Referring to FIG. 7, the respective main patterns 22 of the three-dimensional effect forming portion 20 according to the present embodiment may have a pattern structure in a triangular cross section form. When each of the main patterns 22 has the triangular cross section structure, each of the inclined surfaces 221 formed on the triangular cross section structure has a fixed inclination angle in the x-direction. That is, each of the inclined surfaces 221 may be designed to be bent to the extent of a fixed inclination angle θ with respect to the direction (z-direction) crossing at right angles to the first surface of the light guide portion.

The inclination angle θ may be about 5° or more and about 85° or less. The inclination angle θ may be further limited in consideration of a refractive index of the light guide portion, but the inclination angle may be basically designed in the range of about 5° to 85° in consideration of reflection and refraction beyond a fixed level from the inclined surfaces 221.

In one embodiment, when the refractive index of the light guide portion ranges from about 1.30 to 1.80, an inclination angle of the inclined surface 221 of the respective main patterns 22 may be larger than 33.7° and smaller than 50.3°, or may be larger than 49.7° and smaller than 56.3° according to a standard direction (z-direction or y-direction).

Also, in another embodiment, the light guide portion or the three-dimensional effect forming portion may be made of a material having a high refractive index. For example, in the case of manufacturing high intensity LEDs, when a ray of light having a specific incidence angle penetrates a capsule material by passing along a semiconductor die, total internal reflection is performed due to a difference in an n value (a refractive index) between the semiconductor die (n=2.50~3.50) and a general polymeric capsule element (n=1.40~1.60), and accordingly, light extraction efficiency of the device is reduced. Thus, in order to properly solve this problem, a high refractive index polymer (n=1.80~2.50) is used. In the present embodiment, the light guide portion or the main patterns 22 may be provided by utilizing the high refractive index polymer (n=1.80~2.50) used in manufacturing high intensity LEDs. In this case, the inclination angle of the inclined surface 221 of each main pattern 22 may be larger than 23.6° and smaller than about 56.3°.

The inclination angle according to the refractive index may be represented by following Equation 4 according to the Snell's law.

$$\frac{\sin\theta_1}{\sin\theta_2} = \frac{n2}{n1} \quad \text{[Equation 4]}$$

In Equation 4, sin θ1 is an incidence angle or a refraction angle of light shown in a first medium having a first refractive index n1, and sin θ2 is a refraction angle or an incidence angle of light shown in a second medium having a second refractive index n2.

As previously described, with regard to the optical member of the present embodiment, each inclined surface of the main patterns may be provided to have an inclination angle θ ranging from about 5° to about 85° as an inclination angle which enables an incident beam to be reflected or refracted appropriately.

Also, according to the main patterns 22 of the present embodiment, in addition to the inclination angle of the inclined surface, a rate of a width w to a height h may be limited to a fixed rate for convenience of a production process. The width w may be a pitch of the main pattern. For example, when the main patterns of the optical member are designed so as to emphasize a cubic effect of the line-shaped beam, the width w may be provided to be equal to or smaller than the height h. Also, when the main patterns are designed so that the three-dimensional effect beam can express relatively long images, the width w of the main pattern 22 may be provided to be larger than the height h.

The width w may be 10 to 500 μm. This width w may refer to an average distance between adjacent main patterns in the x-direction and may be adjusted according to a pattern design or a desired optical image shape.

As another example, when the main pattern 22 has a lenticular form, the main patterns may be designed such that a rate (h/w) of a width (or a diameter) to a height of the main pattern 22 is about ½ or less, or an inclination angle θ of the inclined surface is about 60° or less.

Also, when a rate (h/w) of a width to a height of each of the main pattern 22 is designed to be about 1 or less, it may be easy to produce the patterns compared to the case in which a rate (h/w) of the width to the height of the main pattern 22 is 1 or more.

As such, in the present embodiment, as the optical member is designed using the width and the height of the main pattern 22 as factors for property adjustment, optical images resulting from line-shaped beams or three-dimensional effect beams can be easily controlled.

Figure 8:
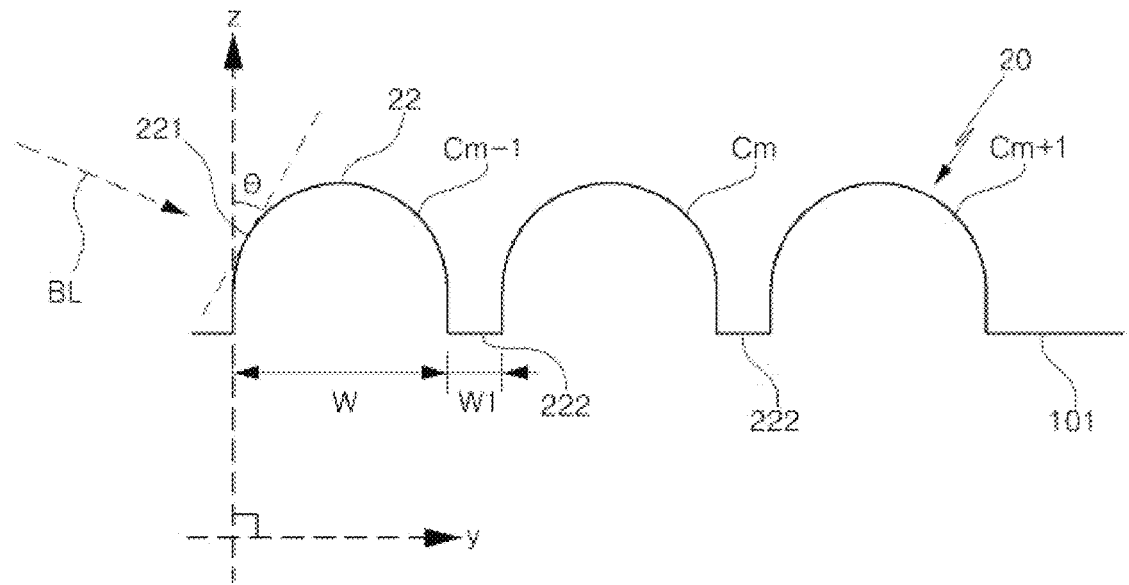
FIG. 8 is a partially enlarged cross-sectional view showing main patterns of another embodiment which can be applied to the optical member of FIG. 1.

FIG. 8 is a partially enlarged cross-sectional view showing main patterns of another embodiment which can be applied to the optical member of FIG. 1.

Referring to FIG. 8, the optical member according to the present embodiment includes the main patterns 22 in a lenticular form having a pattern structure in a semi-circular cross section or a semielliptical cross section-like shape as the main patterns 22 of the three-dimensional effect forming portion 20. Each of the main patterns 22 has an inclined surface inclined at a predetermined angle in a thickness direction (z-direction) of the light guide portion or a direction (y-direction) to which the first surface or a pattern arrangement surface 101 extends. Each of the patterns 22 may have a symmetrical form based on a center line (not drawn) in the z-direction.

Due to the semi-circular structure, each inclined surface of the main patterns 22 may have a structure in which a position on the inclined surface meeting the incident beam BL is changed. That is, since the inclined surface 221 of the main pattern 22 is a surface in contact with an arbitrary point in a circular arc form, a tangent line in contact with the arbitrary point on the main pattern 22 or a surface in contact with the arbitrary point may be placed at a fixed inclination angle θ in the direction (the z-direction) crossing at right angles to the first surface or the pattern arrangement surface of the main patterns. The inclination angle θ may be larger than 0° and smaller than 90° according to each position of a circular cross section which the beam BL hits.

In the present embodiment, the main patterns of the three-dimensional effect forming portion 20 may include each separation portion 222 provided between two adjacent patterns. For example, when the main patterns 22 include a first main pattern Cm−1, a second main pattern Cm and a third main pattern Cm+1 (wherein, m is a natural number of 2 or more), the three-dimensional effect forming portion 20 may include the separation portions 12 provided between the first main pattern Cm−1 and the second main pattern Cm, and between the second pattern Cm and the third main pattern Cm+1.

Meanwhile, the separation portion 222 may be a part of the first surface positioned between two adjacent patterns as a part of the first surface 101 of the light guide portion in which concave main patterns are not formed. Also, the separation portion 222 may be provided for convenience of the manufacturing process as a gap between two adjacent main patterns. The separation portion 222 may be omitted according to a manufacturing process or a main pattern design.

When the separation portion 222 is included, a width w1 of the pattern separation portion 222 is designed to be smaller than a width w of the main pattern 22. The width w1 of the pattern separation portion 222 is may be about ⅕ or less or several μm or less of the width w of the main pattern 22. When the width w1 of the separation portion 222 is greater than the width w of the main pattern 22, it may be difficult to implement the line-shaped beam from the main pattern 22.

Figure 9:
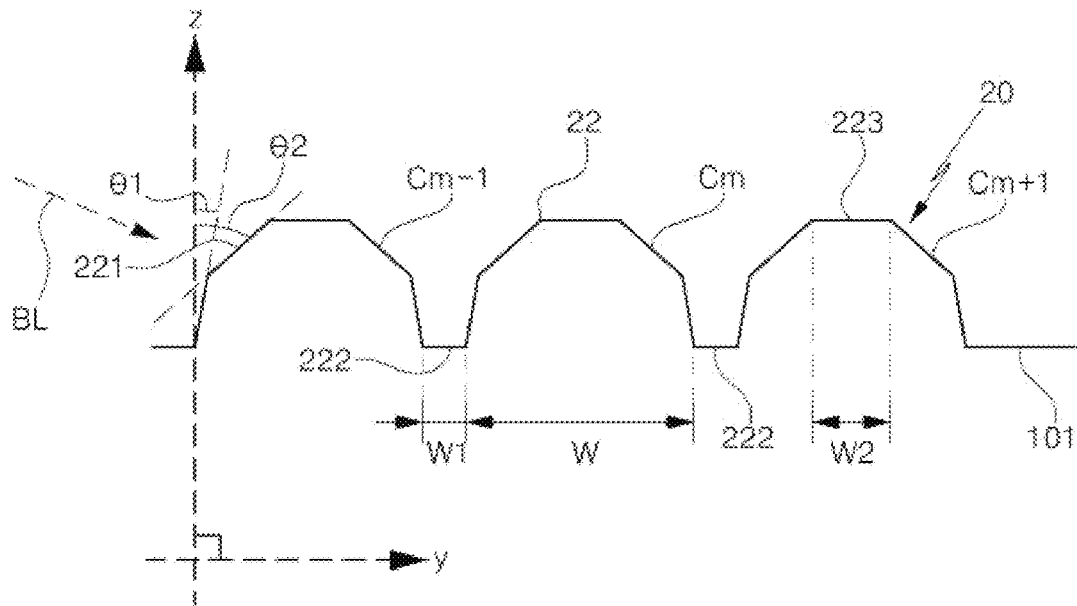
FIG. 9 is a partially enlarged cross-sectional view showing main patterns of still another embodiment which can be applied to the optical member of FIG. 1.

FIG. 9 is a partially enlarged cross-sectional view showing main patterns of still another embodiment which can be applied to the optical member of FIG. 1.

Referring to FIG. 9, the optical member according to the present embodiment includes the main patterns having a pattern structure in a polygonal section form as the main patterns of the three-dimensional effect forming portion 11. Each of the inclined surfaces 221 of the main patterns 22 has a broken-line graph form.

Each of the inclined surfaces 221 of the main patterns 22 is provided so as to have multiple inclination angles θ1, θ2 according to the number of segments of the broken-line graph in the direction (z-direction) crossing at right angles to a thickness direction or the first surface of the light guide portion or the first surface 101. The second inclination angle θ2 may be larger than the first inclination angle θ1. The first and second inclination angles θ1, θ2 may be designed within the range which is larger than about 5° and smaller than about 85° according to a position where the beam BL hits.

Also, the three-dimensional effect forming portion 20 of the present embodiment may include a separation portion 222 provided between two adjacent main patterns. For example, when the main patterns 22 include a first pattern Cm−1, a second pattern Cm and a third pattern Cm+1, the three-dimensional effect forming portion 20 may include the separation portions 222 between the first pattern Cm−1 and the second pattern Cm, and between the second pattern Cm and the third pattern Cm+1.

The width w1 of the pattern separation portion 222 is smaller than the width w of the main pattern in order to naturally implement a line-shaped beam or a three-dimensional effect beam via the three-dimensional effect forming portion 20. When a line-shaped beam or a three-dimensional effect beam having a desired shape (a shape without an interruption or the like) is implemented through a design of the multiple patterns, the width w1 of the pattern separation portion 222 may be designed to be narrow maximally or the pattern separation portion 102 may be omitted. In this case, the pattern separation portion 102 is designed to have the width w1 of several μm or less.

Also, the three-dimensional effect forming portion 20 of the present embodiment may have an interrupted surface 223 that is almost parallel to the first surface 101 on the main patterns 22. The interrupted surface 223 is a part which does not function to enable light to be substantially emitted to the outside through the reflection or refraction of the incident beams. Thus, since the line-shaped beams implemented by the multiple patterns may have an interrupted part corresponding to the interrupted surface 223, a width w2 of the interrupted surface 223 may be appropriately designed in a range of several μm or less in order to implement line-shaped beams having desired shapes. Of course, the interrupted surface 223 may be omitted in order to implement natural line-shaped beams.

Figure 10:
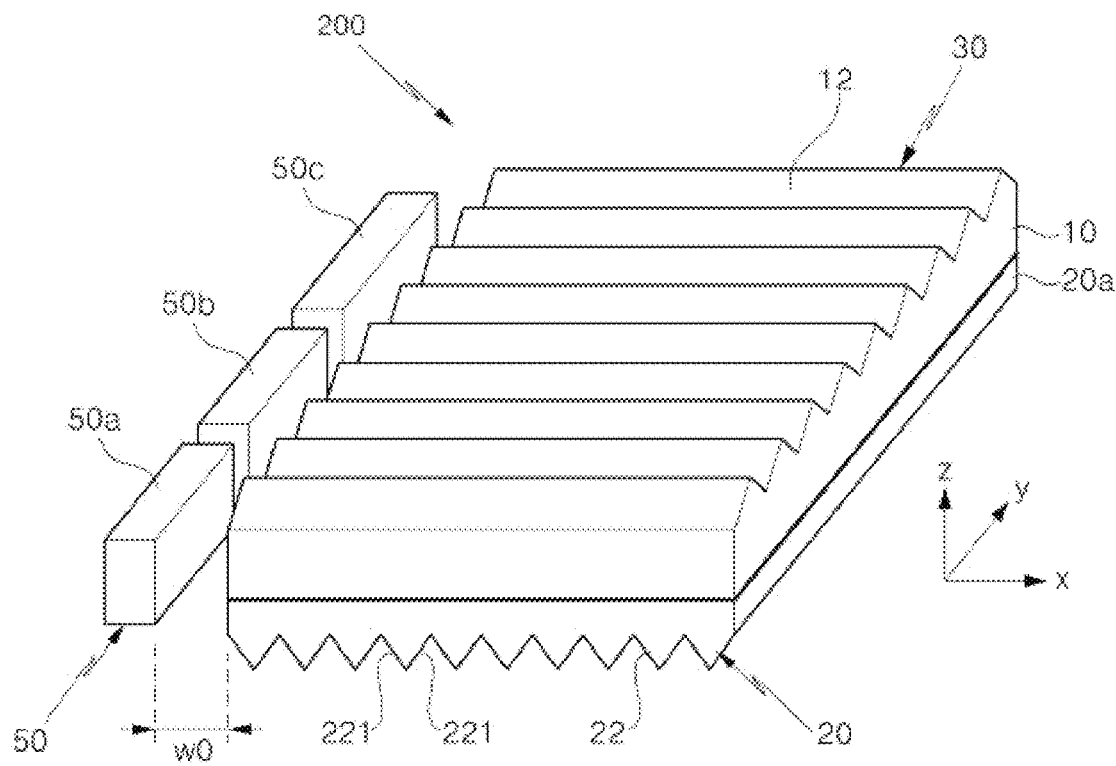
FIG. 10 is a perspective view of a lighting device according to another embodiment of the present application.
Figure 11:
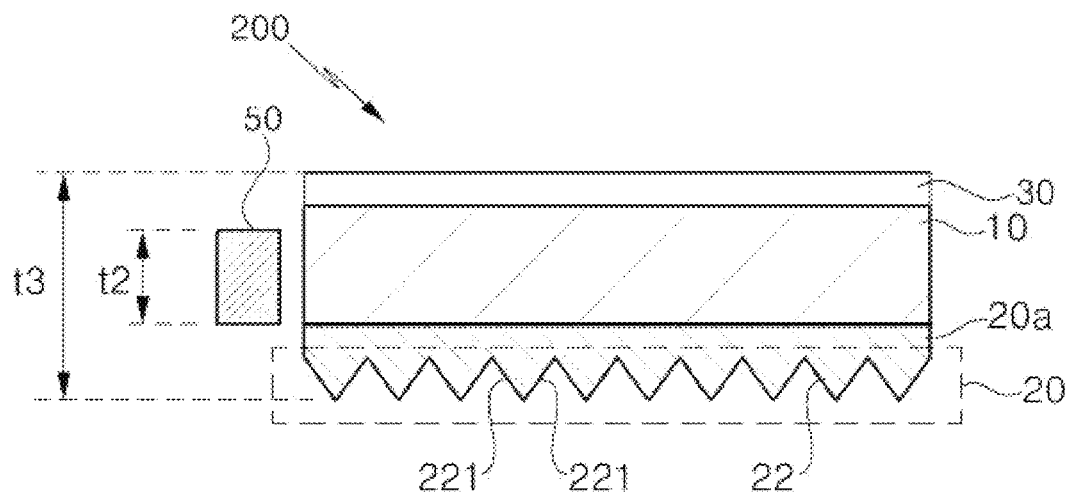
FIG. 11 is a cross-sectional view of the lighting device of FIG. 10.

FIG. 10 is a perspective view of a lighting device according to another embodiment of the present application. FIG. 11 is a cross-sectional view of the lighting device of FIG. 10.

Referring to FIGS. 10 and 11, a lighting device 200 according to the present embodiment is configured to include: the light guide portion 10; the three-dimensional effect forming portion 20; the multi-effect forming portion 30; and the light source portion 50.

The light guide portion 10 has the form of a plate or film made of a transparent material and guides the incident beam supplied from the light source portion 50 from one side to another side via internal reflection. Furthermore, as a base substrate, the light guide portion supports the three-dimensional effect forming portion 20 provided on the first surface and the multi-effect forming portion 30 provided on the second surface opposite to the first surface.

The three-dimensional effect forming portion 20 includes the main patterns 22 provided by a first pattern layer 20a bonded to the first surface of the light guide portion 10. The first pattern layer 20a may result from implementing uneven patterns having convex portions and concave portions using a curable resin. The first pattern layer 20a may be disposed to be closely attached to the first surface of the light guide portion 10 via a production process for curing the first pattern layer 20a from the first surface of the light guide portion 10.

The multi-effect forming portion 30 includes the optical patterns 32 provided on the second surface of the light guide portion 10. The optical patterns 32 may be provided in a form in which a part of the second surface of the light guide portion 10 is removed.

The light source portion 50 is disposed to irradiate an incident beam to on one surface of the light guide portion 50. The one side of the light guide portion 50 is located at one side in a sequential arrangement direction of the main patterns 22. In the present embodiment, the light source portion 50 includes multiple light sources 50a, 50b, 50c. In this case, the main patterns 22 may create at least three line-shaped beams according to the number of the light sources. Also, when one light source includes multiple LED elements as a light source package, the main patterns 22 may create multiple line-shaped beams through multiple incident beams irradiated from the corresponding light source package.

The lighting device 200 according to the present embodiment is substantially identical to the lighting device 100 previously described with reference to FIGS. 1 to 4 except for the first pattern layer 20a, the plurality of light sources 50a, 50b, 50c and a modified combination relation of the light guide portion 10 with the first pattern layer and the light sources. Thus, additional detailed description on the constitutive elements is omitted for avoiding overlapping of the description.

Figure 12:
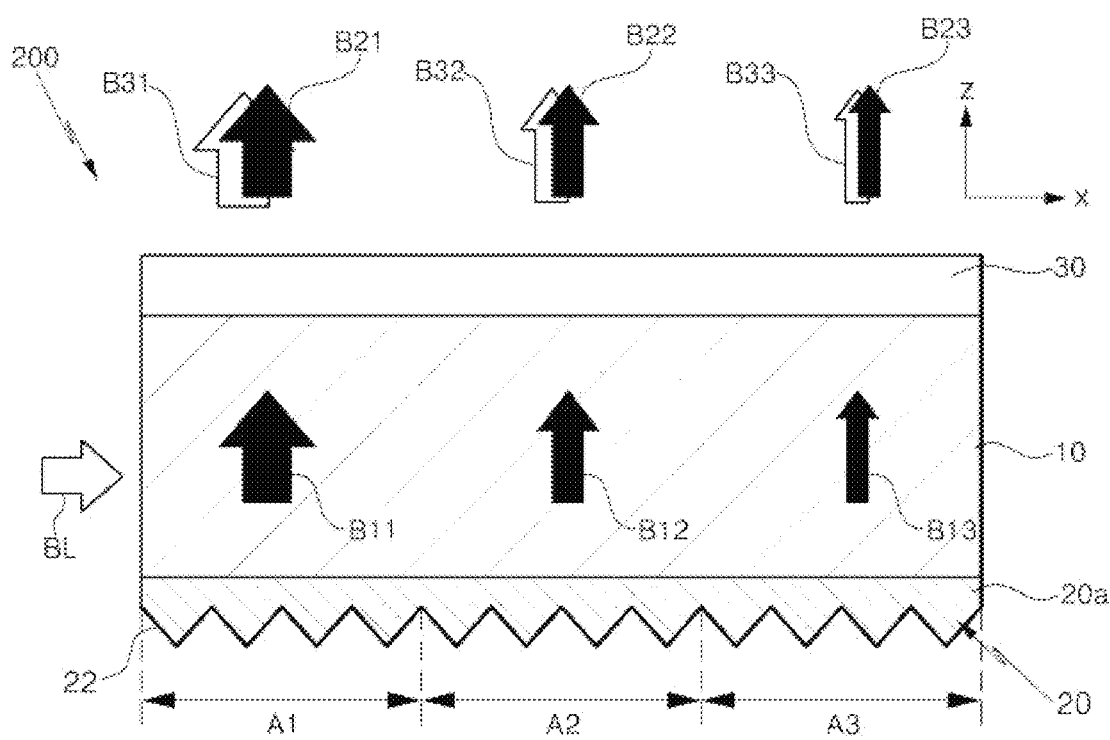
FIGS. 12 and 13 are schematically enlarged cross-sectional views illustrated for explaining an operation principle of the lighting device of FIG. 10.
Figure 13:
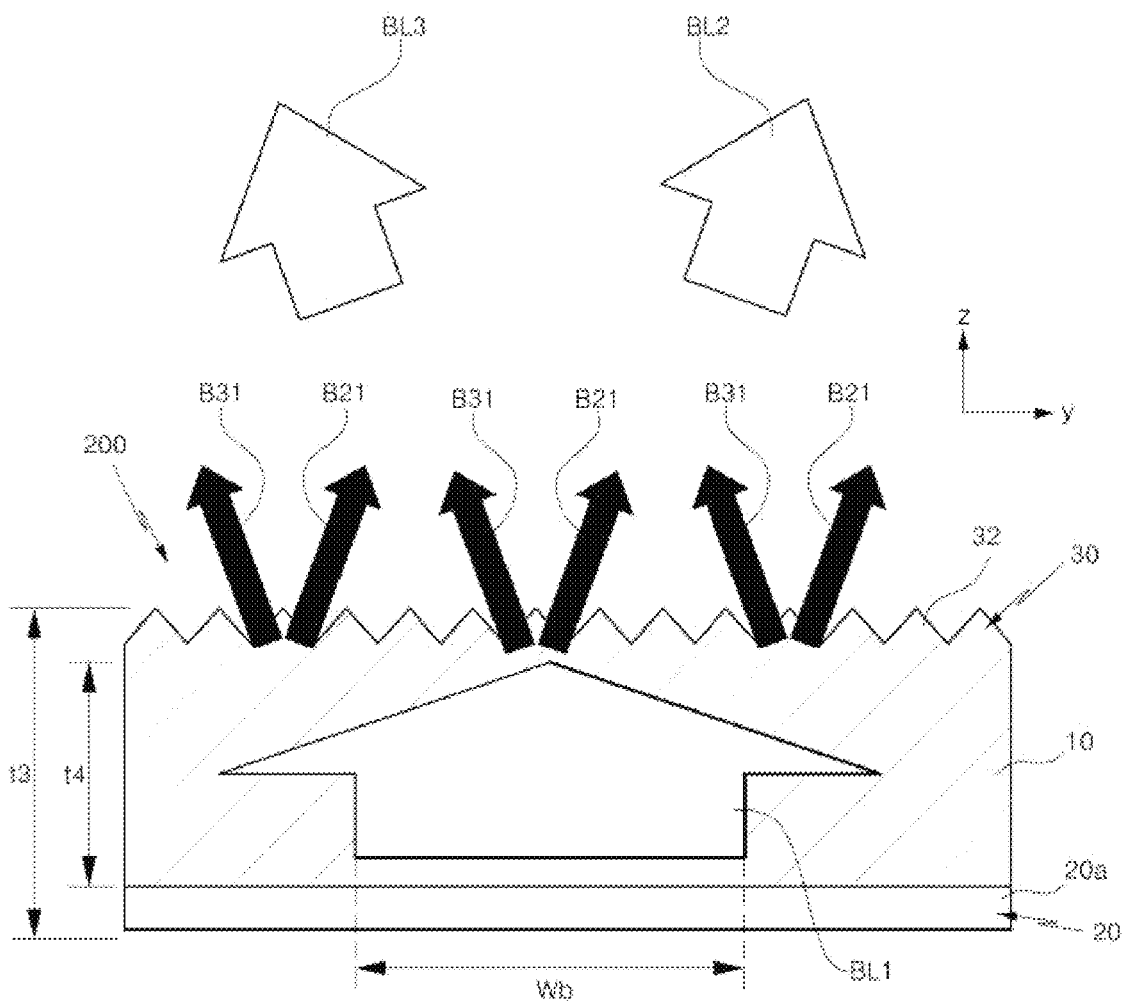

FIGS. 12 and 13 are schematically enlarged cross-sectional views illustrated for explaining an operation principle of the lighting device of FIG. 10.

Figure 14:
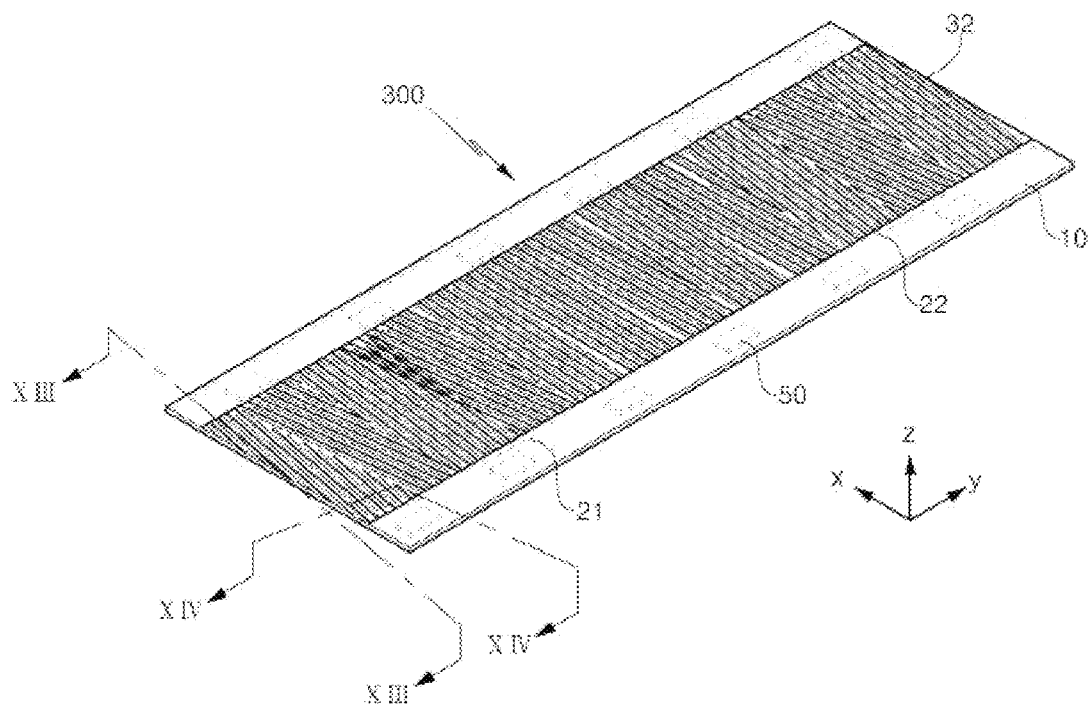
FIG. 14 is a perspective view of a lighting device according to still another embodiment of the present application.

FIG. 12 may correspond to a partially enlarged cross-sectional view taken along line X-X of the lighting device of FIG. 14. FIG. 13 may correspond to a schematically partially enlarged cross-sectional view taken along line X-X of the lighting device of FIG. 14.

Referring to FIG. 12, according to a lighting device 200 of the present embodiment, the main patterns 22 sequentially arranged on the first surface of the light guide portion 10 are divided into a first area A1, a second area A2 and a third area A3 according to a distance from the light source (see LS of FIG. 3) placed at a predetermined position resulting from going back to the direction in which the light BL is irradiated. At this time, an incident beam guided into an arrangement direction of the main patterns 22 while passing along the three-dimensional effect forming portion 20 is refracted or reflected in a thickness direction (z-direction) of the light guide portion 10 by the inclined surfaces of the main patterns.

In this case, since the main patterns of the first area A1 are positioned at the nearest distance from the light sources, the main patterns have refraction and reflection efficiency of the highest level, and serve as indirect light sources of a first luminous intensity. Since the main patterns of the second area A2 are positioned after the main patterns of the first area A1 in a traveling direction of the light BL, the main patterns have refraction and reflection efficiency of a middle level smaller than the level of the main patterns of the first area A1 and serve as indirect light sources of a second luminous intensity smaller than that of the first luminous intensity. Since the main patterns of the third area A3 reflect and refract the light passing along the main patterns of the first area A1 and the second area A2, the main patterns have refraction and reflection efficiency of a level smaller than the level of the main patterns of the second area and serve as indirect light sources of a third luminous intensity smaller than that of the second luminous intensity.

According to the aforesaid three-dimensional effect forming portion 20, as viewed from a specific standard point or an observing point, the main patterns positioned farther away from the light sources in main moving directions of light or in the first path may serve as indirect light sources for emitting the light of the light sources positioned farther away from the main patterns. That is, the main patterns serve as indirection light sources have a perceptional depth or a sense of distance in a form in which the light enters the light guide portion 10 in the thickness direction of the light guide portion 10 of the first path, thereby creating line-shaped beams having luminous intensity B11, B12, B13 showing a sequential reduction in the intensity of light.

That is, the single line-shaped beam traveling in the thickness direction of the light guide portion 10 is divided into two beams by the optical patterns of the multi-effect forming portion 30. Due to such an operation of the optical patterns, the single line-shaped beams B11, B12, B13 passing through the multi-effect forming portion 30 are converted into multiple line-shaped beams of first line-shaped beams B21, B22, B23 and second line-shaped beams B31, B32, B33.

As illustrated in FIG. 13, implementing of the single line-shaped beams and conversion into the multiple line-shaped beams as described above may be more clearly confirmed when viewed from the pattern extension direction (y-direction) of the main patterns and the sequential arrangement direction (the x-direction of FIG. 12) crossing at right angles to the thickness direction (z-direction) of the light guide poriton 10.

According to the lighting device 200 according to the present embodiment, the single line-shaped beam BL1 (corresponding to B11, B12 and B13 of FIG. 12) generated from the main patterns of the three-dimensional effect forming portion is divided into the multiple line-shaped beam B21 and B31 by the optical patterns 32 of the multi-effect forming portion 30. Thus, when viewed from a predetermined standard point in the z-direction, a first line-shaped beam BL2 (corresponding to B21, B22 and B23 of FIG. 12) located at the left of the optical path of the single line-shaped beam BL1 in the second surface direction of the light guide portion 10 and a second line-shaped beam BL3 (corresponding to B31, B32 and B33 of FIG. 12) located at the right of the optical path of the single line-shaped beam are displayed.

According the aforesaid embodiment, a width Wb of the single line-shaped beam BL1 is equal to or smaller than a width of the light emitting surface of the light source of the light source portion. In this case, since the single line-shaped beam BL1 is formed by an incident beam having a strong straight property, desired optical images can be easily implemented by a design of the main patterns. The light source irradiating the incident beam having the strong straight property may be an LED light source. When the LED light source is used, various colors can be easily implemented.

Also, with regard to the lighting device 200 according to the present embodiment, a thickness t3 of the optical member (or the lighting device) provided in a lamination structure of the light guide portion 10, the three-dimensional effect forming portion 20 and the multi-effect forming portion 30 or the lighting device 200 may range from about 10 to 250 μm in the case of a sheet or film structure which enables roll winding, and may be larger than 250 μm and about 500 μm or less in the case of a plate structure which does not enable roll winding.

When the thickness t3 of the optical member is thinner than 10 μm, durability and a handling ability may be remarkably reduced. Also, when the thickness t3 of the optical member is thicker than 500 μm, a weight may be increased due to the optical member in a plate form, and a cost for producing the optical member to be transparent may be increased.

A thickness of the first pattern layer 20a forming the main patterns 22 of the three-dimensional effect forming portion 20 may be about several μm or more and about tens of μm or less. When the thickness of the first pattern layer 20a is smaller than several μm, it may be difficult to process the main patterns, and when the thickness thereof exceeds tens of μm, a volume and a cost may be increased.

In the present embodiment, a substantial thickness t4 of the light guide portion 10 is identical to or is larger than a height of the light emitting surface of the light source of the light source portion. When the thickness t4 is smaller than the height of the light emitting surface of the light source, the incident beam emitted from the light source is not properly incident to the inside of the light guide portion 10, and accordingly, the light guide portion 10 may serve as a light guide member for guiding the incident beam.

According to the present embodiment, the lighting device 200 creates single line-shaped beams having a three-dimensional effect via a main pattern design and an optical pattern design using the incident beam incident to the light guide portion 10 and converts single line-shaped beams into multiple line-shaped beams, thereby displaying the multiple line-shaped beams.

Figure 15:
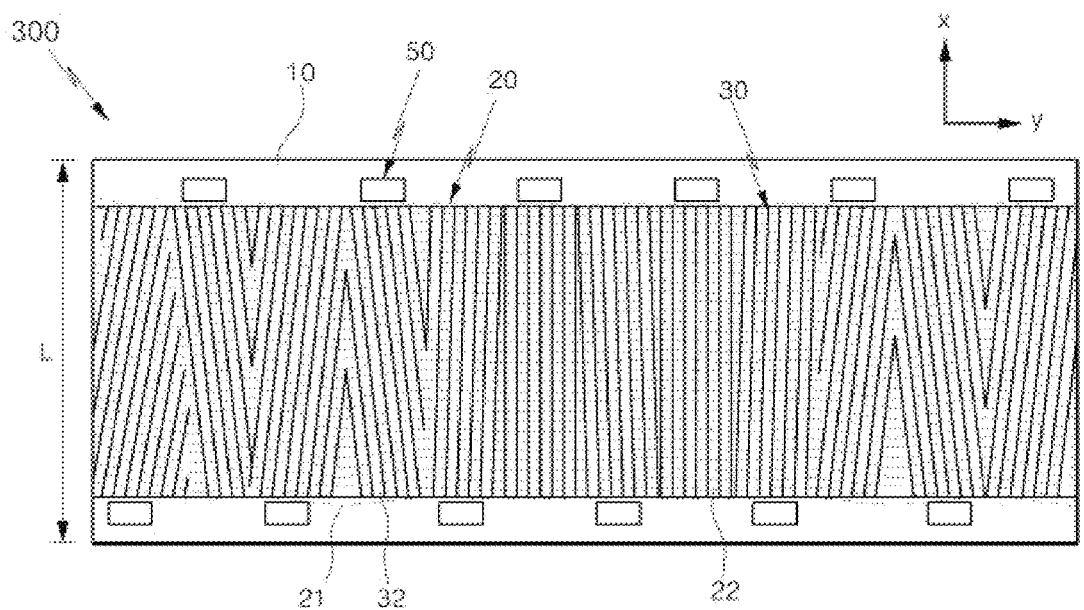
FIG. 15 is a plan view of the lighting device of FIG. 14.

FIG. 14 is a perspective view of a lighting device according to still another embodiment of the present application. FIG. 15 is a plan view of the lighting device of FIG. 14.

Referring to FIGS. 14 and 15, a lighting device 300 according to the present embodiment includes: the light guide portion 10; the three-dimensional effect forming portion 20; the multi-effect forming portion 30; and the light source portion 50. The light source of the light source portion 50 is buried by the light guide portion 10, and light emitted from the light source is irradiated to the inside of the light guide portion 10.

The three-dimensional effect forming portion 20 includes the main patterns 22 disposed on the first surface of the light guide portion 10 having a predetermined length L in a width direction. The three-dimensional effect forming portion 20 includes multiple main patterns arranged in different areas of the first surface of the light guide portion 10. Two adjacent main patterns may have extension directions crossing each other. In this case, a pattern bending portion 21 may be formed at a boundary of the two adjacent main patterns.

When the three-dimensional effect forming portion 20 includes first main patterns and second main patterns provided in different areas of the first surface, a first pattern arrangement direction of the first main patterns and a second pattern arrangement direction of the second main patterns may be parallel to each other or may cross each other.

According to the present embodiment, in the multiple areas of the light guide portion 10, the three-dimensional effect forming portion 20 may display single line-shaped beams irradiated from the first surface direction or the second surface direction of the light guide portion 10 to different directions via the multiple main patterns sequentially arranged in multiple directions and the light source irradiating light to the main patterns.

The multi-effect forming portion 30 includes the optical patterns 32 disposed on the second surface of the light guide portion 10. The multi-effect forming portion 30 includes multiple optical patterns disposed in different areas from each other. When the multi-effect forming portion 30 includes first optical patterns and second optical patterns provided in different areas of the second surface of the light guide portion 10, a first pattern arrangement direction of the first optical pattern and a second pattern arrangement direction of the second optical pattern may be parallel to each other or may cross each other.

In the present embodiment, the main patterns 22 and the optical patterns 32 correspond to 12 pairs of patterns having a lamination structure and individually disposed in twelve areas on both surfaces of the light guide portion 10 to correspond to twelve light sources. The optical patterns 32 have a lamination structure in which the optical patterns and the main patterns 22 corresponding thereto are disposed on both surfaces of the light guide portion 10 facing each other. The pattern extension direction of the optical patterns 32 may cross at right angles to the pattern extension direction of the main patterns 22 corresponding to the optical patterns or may cross the pattern extension direction of the main patterns as viewed from the plane.

The light source portion 50 includes twelve light sources embedded in the light guide portion 10. The respective light sources are arranged to irradiate light to different areas. When the light source portion 50 includes a first light source and a second light source, the first light source and the second light source may irradiate light from the same direction to directions parallel to each other or to directions crossing each other. Also, according to some embodiments, when the light source portion 50 includes the first light source and the second light source, the first light source and the second light source may be disposed to irradiate light from opposite directions to directions parallel to each other or to directions different from each other having an angle of more than 90° and less than 180° between the first light source and the second light source.

An LED package including at least one LED (Light Emitting Diode) element may be used as the light source of the light source portion 50. When the LED package as a light source irradiates light to a hemisphere area based on the light emitting surface, the optical member may implement a line-shaped beam in a specific optical path (the first path) via a design of the main patterns in the hemisphere area.

A process for generating single line-shaped beams and a process for converting the single line-shaped beams into multiple line-shaped beams will be hereinafter described in further detailed.

Figure 17:
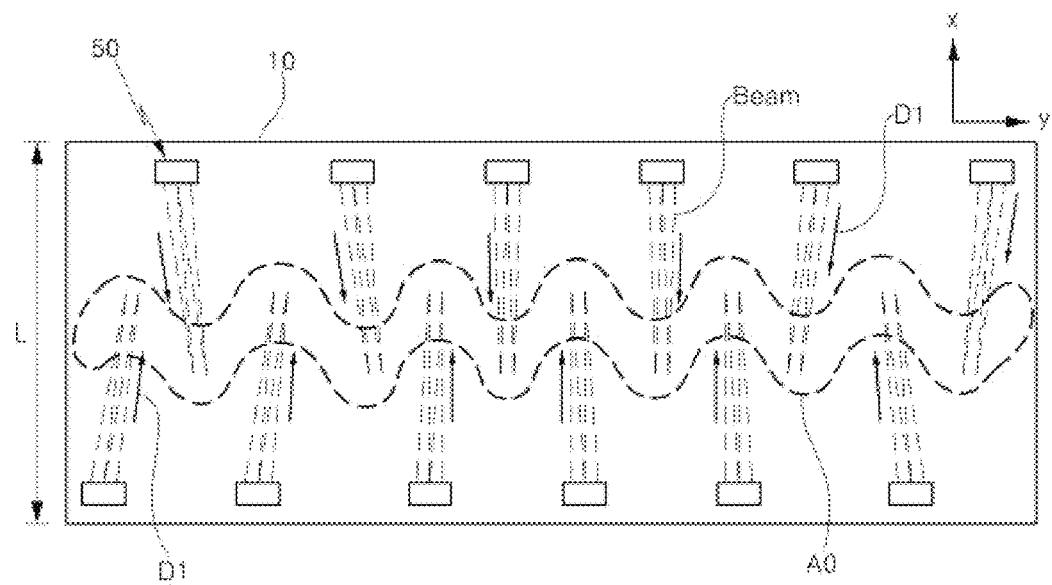
FIG. 17 is a plan view showing an operational state of the lighting device of FIG. 16.
Figure 18:
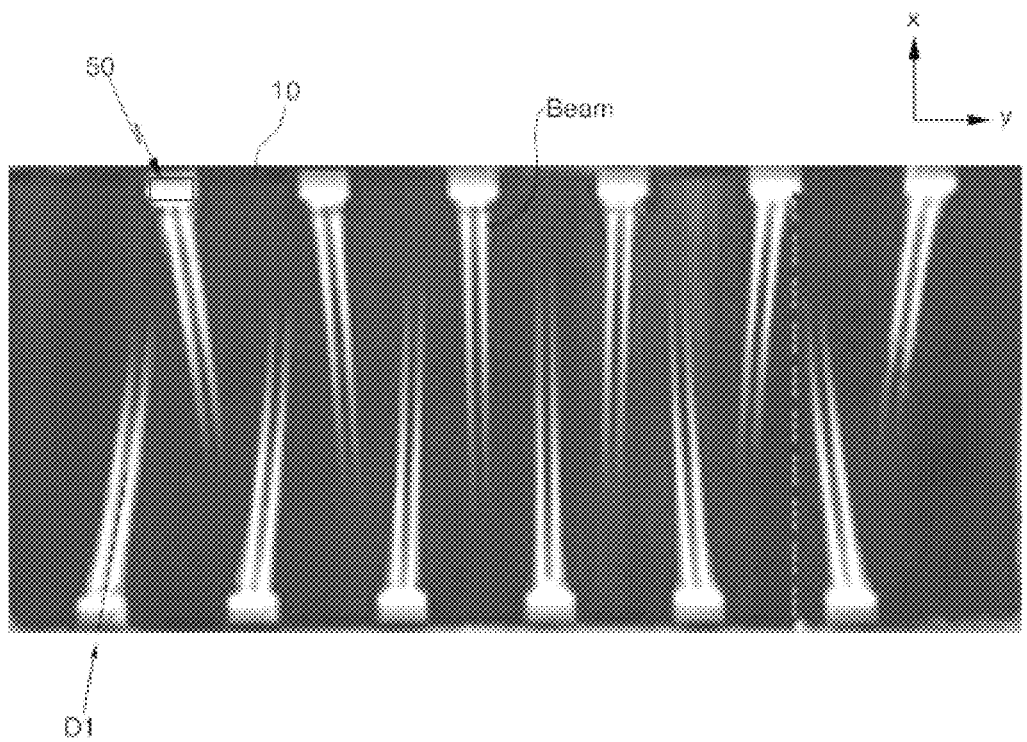
FIG. 18 is a view showing an operational state of the lighting device of FIG. 16.
Figure 19:
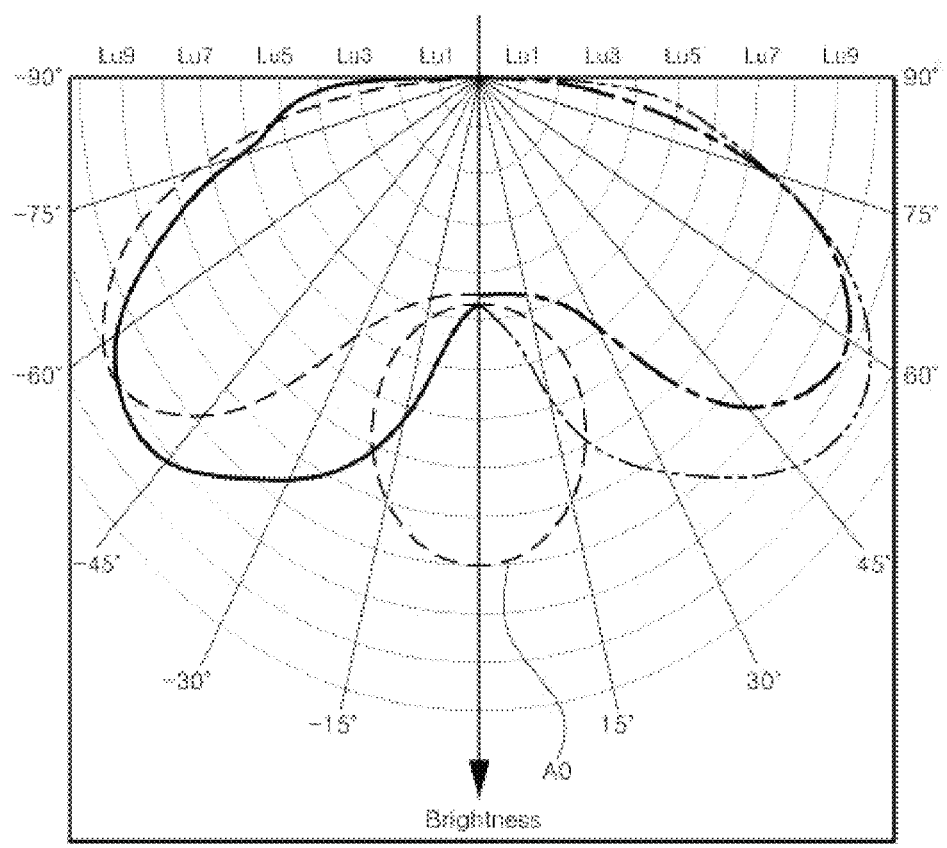
FIG. 19 is a luminance graph of the lighting device of FIG. 18.
Figure 20:
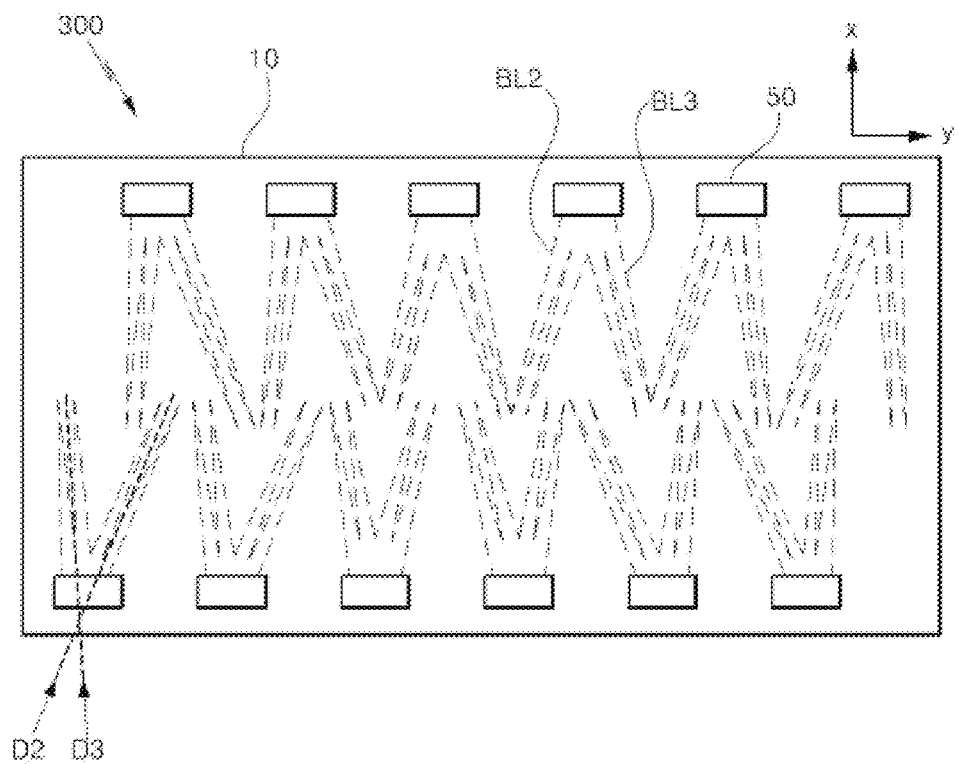
FIG. 20 is a plan view showing an operational state of the lighting device of FIG. 14.
Figure 21:
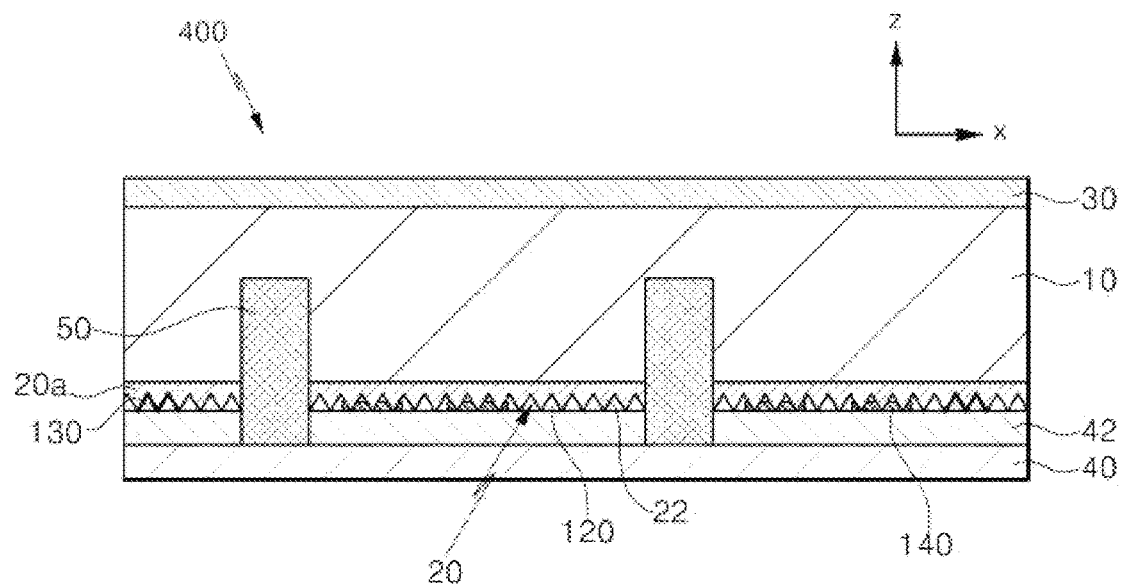
FIG. 21 is a partially cross-sectional view showing a lighting device according to still another embodiment of the present application.

FIG. 16 is a plan view showing a structure of the lighting device of FIG. 14 in which a multi-effect forming portion is omitted. FIG. 17 is a plan view showing an operational state of the lighting device of FIG. 16. FIG. 18 is a view showing an operational state of the lighting device of FIG. 16. Furthermore, FIG. 19 is a luminance graph of the lighting device of FIG. 18. Also, FIG. 20 is a plan view showing an operational state of the lighting device of FIG. 14. FIG. 21 is a partially cross-sectional view showing a lighting device according to still another embodiment of the present application.

Referring to FIG. 16, according to a lighting device 300 according to the present embodiment, when the multi-effect forming portion formed of the optical patterns of the second surface of the light guide portion 10 is omitted, the lighting device 300 displays incident beams irradiated from twelve light sources of the light source portion 50 as single line-shaped beams in each area by the main patterns of the three-dimensional effect forming portion 20 disposed in twelve areas of the light guide portion 10.

As illustrated in FIG. 17, the lighting device 300 displays line-shaped beams extending to different optical paths D1 in each area of the light guide portion 10. The beams emitted from twelve LED light sources of the light source portion 50 are generated when the LED light sources use an LED package including two LED elements. Two beams emitted from each of the light sources have an optical image (single line-shaped beam) that has luminance gradually reduced by the main patterns according to movement of the beam from the light source to a width direction of the light guide portion 10 and disappears at a central part A0 of the width direction of the light guide portion 10.

Also, when the lighting device 300 according to the present embodiment is actually implemented, as illustrated in FIG. 18, the lighting device 300 creates beams emitted from twelve light sources of the light source portion 50 as line-shaped beams having a specific optical width, a fixed length and a perceptional depth effect in the thickness direction of the light guide portion 10 from the different optical paths D1 according to an arrangement or structure of the main patterns on the first surface of the light guide portion 10, thereby displaying the line-shaped beams.

Here, the perceptional depth effect of the line-shaped beam results from a form of the line-shaped beam in which a root part of the line-shaped beam is located to be close to the second surface of the light guide portion 10, an end part is located to be close to the first surface opposite to the second surface when the line-shaped beam extends from a root part of the light source to an end part of the central area A0 of the light guide portion, namely, a form in which the line-shaped beam is irradiated to be bent from the second surface of the light guide portion 10 to the first surface.

The perceptional depth effect of the line-shaped beam may be confirmed through the result of measuring luminance of the lighting device 300 of FIG. 18. That is, as illustrated in FIG. 18, through the luminance graph resulting from a specific width direction of the lighting device 300, it can be seen that luminance of the first part A0 corresponding to the central part A0 of the light guide portion 10 is relatively low compared to the remaining other parts because the line-shaped beam disappears at the central portion A0 of the light guide portion 10.

That is, based on about Lu12 which is a maximum luminance of the lighting device 300, a first luminance (about Lu5) is shown in a second surface of the lighting device 300 or in a central area A0 of the light emitting surface. It can be seen that a value of the first luminance is relatively largely small compared to that of a second brightness (about Lu7 to about Lu12) in the different areas of the front of the light emitting surface. In particular, in consideration of the fact that the first luminance in the central area A0 is affected by the second luminance in the different areas of the periphery, the intensity of light of the light emitting surface corresponding to the central area A0 can be really predicted to be near to 0.

Referring to FIG. 16, when the intensity of light of the light source is Lu12 maximally, it can be seen that a first luminance (about Lu5) in the central area A0 of the front of the light emitting surface of the light source of the lighting device (see reference numeral 300 of FIG. 13) is relatively largely small compared to a second luminance (about Lu7 to about Lu12) in the other areas of the front of the light emitting surface. In particular, in consideration of the fact that the first luminance in the central area A0 is affected by the second luminance in the other areas of the periphery, the intensity of light in the central area A0 of the light emitting surface of the lighting device can be really predicted to be near to 0.

The reason why the measurement results of the graph are shown is because beams passing along the light guide portion 10 are sequentially refracted and reflected from the first path by the main patterns of the three-dimensional effect forming portion and are emitted to the second surface direction. When this principle is used, it can be seen that optical images having desired shapes may be easily implemented through a pattern design.

Meanwhile, twelve single line-shaped beams of FIG. 17 or 18 are divided by the optical patterns of the multi-effect forming portion arranged on the second surface of the light guide portion 10 and are then displayed as multiple line-shaped beams BL2, BL3 as illustrated in FIG. 20. The multiple line-shaped beams displayed in twelve areas of the light guide portion 10 are illustrated such that the single line-shaped beams extend in a state of being divided into a symmetrical form to the right and the left of the optical path by the optical patterns having a prism form or a triangular section form.

The single line-shaped beams may be implemented to extend in a state of being divided into different lengths from the right and the left. Also, when the inclined surface of the optical pattern is provided in a broken segment form, the single line-shaped beam may be converted into two or more multiple line-shaped beams.

As previously described, by designing the pattern extension directions or arrangement of the optical patterns or a cross-sectional structure, single line-shaped beams may be implemented as multiple line-shaped beams having various optical images. For example, when the optical patterns are disposed so that the pattern extension directions of the optical patterns cross the pattern extension directions of the main patterns at an angle of 45° in one direction in addition to a form in which the pattern extension directions of the optical patterns cross at right angles to the pattern extension directions of the main patterns, the single line-shaped beams may be implemented to extend in a state of being divided in different lengths from the right and the left.

FIG. 21 is a partially cross-sectional view showing a lighting device according to still another embodiment of the present application.

Referring to FIG. 21, a lighting device 400 according to the present embodiment includes: the light guide portion 10; the three-dimensional effect forming portion 20; the multi-effect forming portion 30; a support member 40; a reflection portion 42; and the light source portion 50.

The light guide portion 10 is made of a material which enables guiding of an internal incident beam. The material of the light guide portion 10 may be resin. When a resin layer is used as the light guide portion, the light guide portion 10 may have a thin thickness and bendable flexibility.

The resin layer is basically made of a resin material which enables guiding of light. The resin layer may be made of ultraviolet curable resin including an oligomer. Also, the resin layer may be made of resin including a urethane acrylate oligomer as a main material. For example, the resin layer may be produced by using a resin resulting from mixing the urethane acrylate oligomer as a synthetic oligomer and a polyacrylic polymer. Of course, the resin layer may further contain a monomer mixed with IBOA (isobornyl acrylate), HPA (hydroxylpropyl acrylate), 2-HEA (2-hydroxyethyl arrylate) and the like which are low boiling point and diluted type reactive monomers. Also, a photo initiator or an antioxidant may be further mixed as an additive.

The three-dimensional effect forming portion 20 is provided by a first pattern layer 20a made of a transparent material having the main patterns on one surface. The first pattern layer 20a is arranged such that another surface opposite to the one surface comes into contact with the first surface of the light guide portion 10, and the main patterns 10 of the one surface come into contact with the reflection portion 42. Each of the multiple patterns 22 has an inclined surface, and the inclined surface is a mirror-like finishing surface having a smooth surface roughness beyond a predetermined level.

The multi-effect forming portion 30 is disposed on the second surface opposite to the first surface of the light guide portion 10. The multi-effect forming portion 30 may be provided in such a manner that the second pattern layer comes into contact with the second surface of the light guide portion 10, but is not limited thereto. The multi-effect forming portion 30 may have the optical patterns and the pattern extension direction of the optical patterns (for example, the x-direction) may cross at right angles to the pattern extension direction (for example, the y-direction) of the main patterns 22 as viewed from the plane.

The reflection portion 42 is disposed between the support member 40 and the first pattern layer 20a. The reflection portion 42 may be provided in a film form on one surface of the support member. The reflection portion 42 is formed of a material having high reflection efficiency to reflect light emitted from the light source portion 50 to the first surface direction of the light guide portion 10 via the main patterns 22 of the three-dimensional effect forming portion to a side on the main patterns 22. Thanks to this reflection portion 42, light loss of the lighting device 300 can be reduced and a line-shaped beam having a three-dimensional effect can be more clearly expressed.

In order to increase a reflection property of light and a dispersion property of light, a synthetic resin in which a white pigment is diffused and contained may be used as a material of the reflection portion 42. For example, titanium oxide, aluminum oxide, zinc oxide, lead carbonate, barium sulfate, calcium carbonate and the like may be used as the white pigment. Polyethylene terephthalate, polyethylene naphtaenate, acryl resin, poly carbonate, polystyrene, polyolefin, cellulose acetate, weather resistant vinyl chloride and the like may be used as the synthetic resin, but the present application is not limited thereto. In another embodiment, the reflection portion 42 may be implemented using Ag, Al, stainless steel 304SS and so on.

A reflective layer separation portion 120 may be provided between the reflection portion 12 and the main patterns 22. The reflective layer separation portion 120 may be an air gap filled with air, but is not limited thereto. According to some embodiments, the reflective layer separation portion 120 may be filled with a material having a different refractive index from that of the first pattern layer 20a.

Also, the reflection portion 42 may be adhered to the first pattern layer 20a via predetermined adhesive patterns 130 upon lamination with the first pattern layer 20a. In this case, the reflection portion 42 may contribute diversity of optical images by controlling an amount or a position of light reflected from the reflection portion 42 according to a refractive index, a reflection ability of the adhesive patterns 130.

Also, the lighting device 400 according to the present embodiment may further include reflective patterns 140 between the reflection portion 42 and the first pattern layer 20. The reflective patterns 140 may be easily provided on one surface of the reflection portion 42 facing the first pattern layer 20a using ink patterns. The same material as that of the reflection portion 42 may be used as a material of the reflective patterns 140. When the reflective patterns 140 are used, the intensity of light reflected from the reflection portion 42 can be adjusted, thereby contributing to implementation of optical images having various shapes.

The light source portion 50 may include an LED light source having one or two or more LED (Light Emitting Diode) elements. The LED element may have a side view type or an upper view type light emitting structure. Also, the light source portion 50 may be configured to include a separate printed circuit board. The printed circuit board may be a flexible printed circuit board in which conductive circuit patterns are provided on a flexible insulating substrate. The flexible printed circuit board is implemented with the support member 40 so as to have a structure for enabling mounting of the light source of the light source portion 50. In this case, the lighting device 400 may be easily applied to a place or an application product having a curvature.

In the present embodiment, the light source of the light source portion 50 is connected to the support member 40 while passing through the first pattern layer 20a and the reflection portion 42 when viewed from a cross section. When the support member 40 is a flexible printed circuit board, the light source portion 50 may be operated so that the light can be irradiated from the light source by power and a control signal supplied through the flexible printed circuit board.

According to the present embodiment, the lighting device 400, which is configured such that the support member 40 or the reflection portion 42, the first pattern layer 20a and the light source of the light source portion 50 are embedded by the light guide portion 10 provided as a resin layer, guides the beam of the light source portion 50 irradiated in the light guide portion 10 and creates a line-shaped beam by reflection and refraction from the main patterns of the three-dimensional effect forming portion 20, thereby converting the single line-shaped beam into clear multiple line-shaped beams by dividing the single line-shaped beam via the multi-effect forming portion 30.

Also, according to the present embodiment, it is effective to implement line-shaped beams having various shapes or optical images having desired shapes by using the line-shaped beams by controlling a light reflections ability or a reflection area of the reflection portion 42 using the reflective layer separation portion 120, the adhesive pattern 130, the reflective patterns 140, or a combination thereof.

Figure 22:
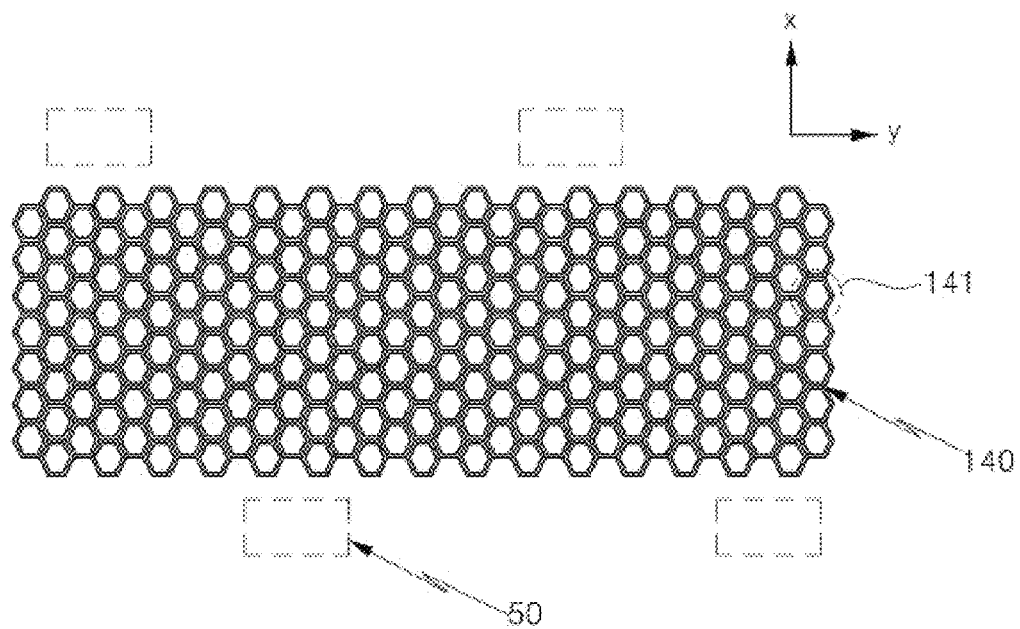
FIG. 22 is a plan view showing reflection patterns which can be applied to the lighting device of FIG. 21.

FIG. 22 is a plan view showing reflection patterns which can be applied to the lighting device of FIG. 21.

Referring to FIG. 22, according to the lighting device according to the present embodiment, the reflective patterns 140 may be provided in a form in which unit patterns 141 having a hexagonal ring-like shape are arranged in plural number, but is not limited thereto. For example, in addition to the hexagonal shape, the reflective patterns 140 may be designed in a polygonal shape, a circular shape, an elliptical shape, a star-like shape, a winding ring-like shape, a stripe shape, a mesh shape or a combination thereof. That is, the pattern shape of each of the reflective patterns 140 may be designed according to optical images having a desired shape or desired three-dimensional effects (clearness, haziness, spreading, and the like) with respect to the optical images.

The reflective patterns 140 may be formed by printing an ink including a reflective material on one surface of the reflection portion 12. When the reflective patterns 140 are used, by reflecting some beams traveling to a lower side of the three-dimensional effect forming portion via the main patterns (see reference numeral 22 of FIG. 21) of the three-dimensional effect forming portion from the light source portion 50 and by returning the reflected beams to the three-dimensional effect forming portion, the most of beams of the light source portion 50 may be emitted to the multi-effect forming portion via the multiple patterns of the three-dimensional effect forming portion. Also, optical images of the line-shaped beams with the three-dimensional effect may be variously changed by adjusting a reflection amount or a reflection area of light according to a design of the reflective patterns 140.

Meanwhile, the adhesive pattern (see reference numeral 130 of FIG. 21) provided on one surface of the reflection portion (reference numeral 42 of FIG. 21) along with the reflective patterns 140 may be provided in separate patterns which overlap with or do not overlap with the reflective patterns 140 without being limited thereto. According to some embodiments, the adhesive pattern may be provided by containing a predetermined adhesive component into the reflective pattern 140. In this case, the reflective pattern 140 may serve as the adhesive pattern 130.

The reflective pattern 140 may contain at least one material selected from $TiO_2$, $CaCO_3$, $BaSO_4$ and silicon.

FIG. 23 is a view showing an operational state of the lighting device of FIG. 21.

Referring to FIG. 23, the lighting device according to the present embodiment is configured to include a plurality of LED elements regularly arranged as light sources. The LED elements include first LED elements adjacent to each other of a first arrangement line and second LED elements of a second arrangement line, and at this time, a light emitting direction of the first LED elements and a light emitting direction of the second LED elements are set to direct to opposite directions. Furthermore, it is assumed that each of the first and second LED elements roughly irradiates light to a hemispherical area on the basis of the light emitting surface.

According to the aforesaid lighting device, beams of the respective LED elements are sequentially emitted to the outside while crossing the second surface of the light guide portion in which the main patterns are arranged beyond a critical angle by reflection and refraction from the main patterns of the three-dimensional effect forming portion which are arranged to be sequentially far away from the respectively LED elements. According to such a configuration, the lighting device may form various optical images of the line-shaped beam having the three-dimensional effect on the three-dimensional effect forming portion to correspond to the respective LED elements.

The line-shaped beam with the three-dimensional effect expresses different optical images of different optical paths according to the movement of an observing point of an observer or a predetermined standard point. As one example, the optical images of the lighting device are expressed as illustrated in (a) of FIG. 23, as viewed from a front upper side in a state of the lighting device being placed on a flat bottom.

That is, the optical images of FIG. 23(a) are expressed as optical images in which a first line-shaped beam group and a second line-shaped beam group of two groups of the LED elements for irradiating light in opposite directions cross in directions facing each other like folding two hands, and in which a crossing angle is gradually increased from a central area to areas of both sides of the left and the right.

Also, the optical images of FIG. 23(a) are expressed so that light emitted from the LED elements positioned at adjacent arrangement lines can have an angle (for example, about 180°±45°) beyond a predetermine part from opposite directions rather than being irradiated in the opposite directions according to a difference in a viewing angle with respect to the respective LED elements.

When viewing the lighting device from a front lower side near to a flat bottom where the lighting device is placed, optical images of the lighting device are expressed as illustrated in (b) of FIG. 23. That is, when the optical images of FIG. 23(b) are compared with those of FIG. 23(a), the line-shaped beams of the multiple LED elements on the same arrangement line appear to be separated from each other rather than overlapping to each other in a direction roughly vertical to the pattern arrangement surface of the main patterns, so that the line-shaped beams can be expressed as optical images having a higher perceptional depth or a three-dimensional effect as a whole.

Furthermore, when viewing the lighting device from the lower part of a side close to the flat bottom where the lighting device is placed, optical images of the lighting device are expressed as illustrated in (c) of FIG. 23. That is, the optical images of FIG. 23(c) are expressed as optical images in which beams in an area near to a standard point do not cross each other and extend in a zigzag form in multiple lines side by side as the beams gradually travel near to far areas.

As such, the lighting device of the present embodiment may implement different optical images different of different optical paths according to a change of an observing point of an observer or a predetermined standard point.

Figure 24:
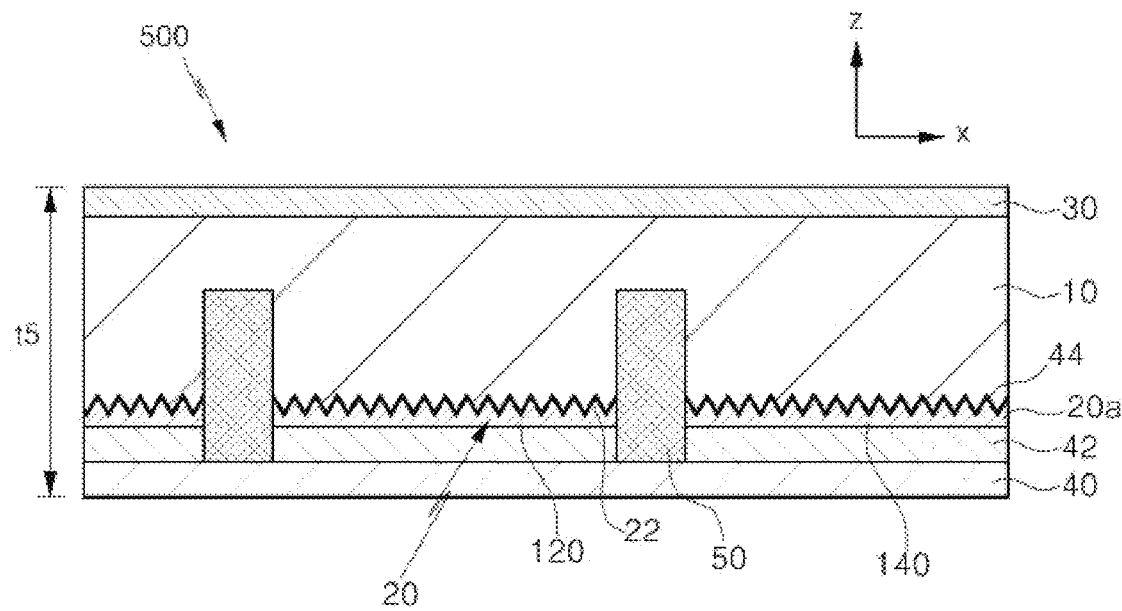
FIG. 24 is a partially cross-sectional view of a lighting device according to still another embodiment of the present application.

FIG. 24 is a partially cross-sectional view of a lighting device according to still another embodiment of the present application.

Referring to FIG. 24, a lighting device 500 according to the present embodiment includes: the light guide portion 10; the three-dimensional effect forming portion 20; the multi-effect forming portion 30; the support member 40; the reflection portion 44; and the light source portion 50.

The three-dimensional effect forming portion 20 is provided by the first pattern layer 20a having the main patterns on one surface. The main patterns 22 may be implemented in various forms such as a prism form, a lenticular form, a tetrahedral form, a conical form and the like.

When the first pattern layer 20a is laminated on the reflection portion 42, the first pattern layer 20a is disposed so that another surface opposite to one surface of the first pattern layer can be placed on the reflection portion 42. Furthermore, a case where the light guide portion 10 is formed on the first pattern layer 20a using resin, in order to prevent the function of the main patterns 22 from being lost due to a small difference in a refractive index therebetween, the separation portion 44 may be provided by thinly coating the main patterns 22 of the first pattern layer 20a with a transparent material having a fixed refractive index, and the light guide portion 10 may be then formed thereon.

That is, when the main patterns 22 of the three-dimensional effect forming portion 20 are placed between the first pattern layer 20a and the light guide portion 10, the main patterns 22 may not properly serve as mains having inclined surfaces due to the resin layer forming the light guide portion 10. In particular, when a refractive index of the light guide portion 10 is similar to that of the first pattern layer 20a, for example, when a difference in the refractive indexes is 0.2 or less, the inclined surfaces of the main patterns located between the light guide portion and the first pattern layer fail to properly perform the refractive or reflective activity of incident beams. In such a case, the main patterns 22 of the three-dimensional effect forming portion 20 may not implement multiple line-shaped beams having a three-dimensional effect because the light of the light source portion 50 is not guided to the multi-effect forming portion 30 located at an upper part of the light guide portion 10.

Accordingly, in the lighting device 500 according to the present embodiment, the separation portion 44 is placed between the main patterns 22 and the light guide portion 10 so that the boundary between the main patterns 22 and the light guide portion 10 can be clear. Thus, a refractive or reflective action of the incident beam by the inclined surfaces of the main patterns may be smoothly maintained, and accordingly, the generation of a single-lined shape beam and conversion of the single-line shaped beam into multiple line-shaped beams may be easily performed. The separation portion 44 may be made of a material identical or similar to that of the reflection portion 42.

The lighting device 500 of the present embodiment may be substantially identical to the lighting device 400 previously described with reference to FIG. 21 except for the fact that the main patterns 22 are provided between the first pattern layer 20a and the light guide portion, and a separation portion 44 in a coating layer form is provided on the main patterns 22.

A thickness of the lighting device 500 may be about 100 to 250 μm or less. When the thickness of the lighting device 500 is smaller than 100 μm, it is difficult to implement a structure in which the LED light source is buried by a resin layer, and durability may be reduced. Also, when the thickness of the lighting device 500 is larger than 250 μm, it is difficult to perform roll winding due to such a thick thickness, handling, carrying expenses are increased, and the lighting device cannot be easily applied to a place or an application having a curvature.

Meanwhile, with regard to the lighting device 500, the multi-effect forming portion 30 may be disposed on the second surface of the light guide portion 10 by interposing an adhesive layer therebetween. In this case, the second pattern layer constituting the multi-effect forming portion 30 may be disposed to be separated from the light guide portion 10 by a predetermined distance. It is preferable that a separation distance be several mm or less. When the separation distance is 10 mm or more, clearness may be remarkably reduced upon converting single line-shaped beam into multiple line-shaped beams.

Figure 25:
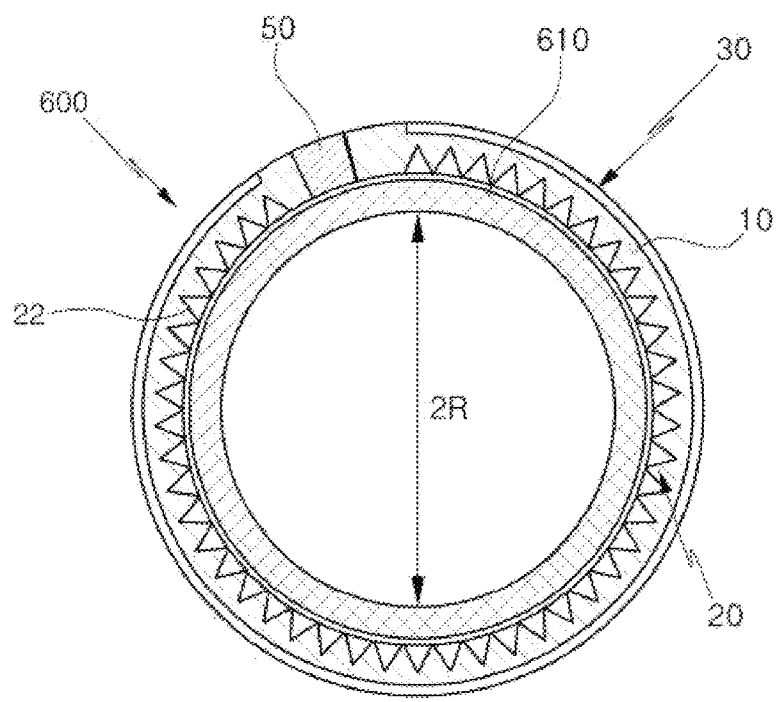
FIG. 25 is a cross-sectional view of a lighting device according to still another embodiment of the present application.

FIG. 25 is a cross-sectional view of a lighting device according to still another embodiment of the present application.

Referring to FIG. 25, a lighting device according to the present embodiment includes: the light guide portion 10; the three-dimensional effect forming portion 20; the multi-effect forming portion 30; the light source portion 50; and a support member 610. The light guide portion 10, the three-dimensional effect forming portion 20 and the multi-effect forming portion 30 may be provided as a single optical member of a sheet phase.

The light guide portion 10 may have a thickness of about 100 to 250 μm or less. When the thickness of the light guide portion 10 is smaller than 100 μm, it may be difficult to produce an LED light source having a height of a light emitting surface which is smaller than 100 μm, and durability may be largely reduced. Also, when the thickness of the light guide portion 10 is larger than 250 μm, flexibility is reduced, so that it may be difficult to install the light guide portion at a support member 610 having a curvature resulting from a predetermined diameter R2.

The three-dimensional effect forming portion 20 includes the main patterns 22 having an uneven shape resulting from removing a part of the first surface of the light guide portion 10. The multi-effect forming portion 30 includes the optical patterns having an uneven shape resulting from removing a part of the second surface opposite to the first surface. The pattern extension directions of the optical patterns cross at right angles to the pattern extension direction of the main patterns 22.

The light source portion 50 is disposed on one side of the light guide portion 10 to supply an incident beam to the one side of the light guide portion 10. The light source portion 50 may be provided an LED package including one or two or more LED elements.

The support member 610 may be a housing having a predetermined curvature, a wall having a curved portion inside or outside a building, or one surface of a product. Of course, the support member 610 may be a flexible printed circuit board. In the present embodiment, the support member 610 has a hollow cylinder shape of a radius R.

That is, the support member 610 may be implemented using devices or products, indoor ceilings or walls inside or outside a building without being specially limited if they enable arrangement of the light guide portion 10 of the sheet phase having one side to which the light of the light source portion 50 is irradiated and the three-dimensional effect forming portion 20. Furthermore, the support member 610 may be implemented using a cap having a plane or a curved surface, clothing, shoes, a bag, an accessory, indoor and outdoor interior components and the like to which the light guide portion 10 of the sheet phase may be attached.

According to the present embodiment, the flexible lighting device 600 is disposed in an application product, an article or a building having a curvature so that illumination of various optical designs displayed by converting a single line-shaped beam into multiple line-shaped beams can be implemented.

Figure 26:
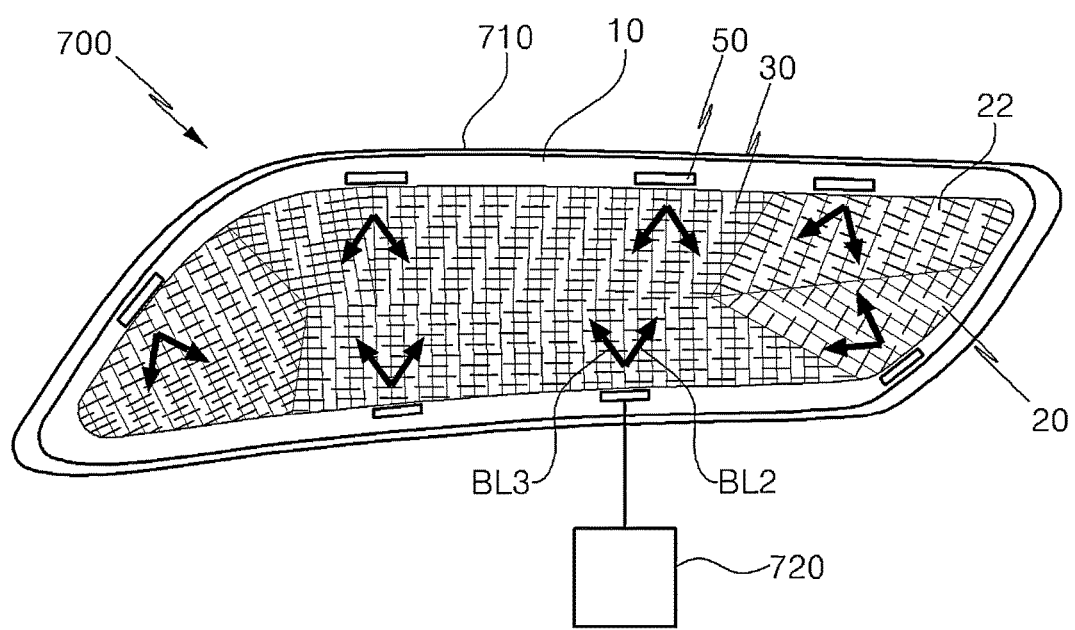
FIG. 26 is a plan view of a lighting device according to still another embodiment of the present application.

FIG. 26 is a plan view of a lighting device according to still another embodiment of the present application.

Referring to FIG. 26, a lighting device 700 according to the present embodiment is configured to include: the light guide portion 10; the three-dimensional effect forming portion 20; the multi-effect forming portion 30; the light source portion 50; and an outer lens 710.

The light guide portion 10 may be substantially identical to the light guide portions of the lighting devices of the embodiments previously described, except for the fact that the light guide portion has a streamlined shape as viewed from a plane and has a curvature from a fixed portion in a thickness direction.

The three-dimensional effect forming portion 20 includes the multiple main patterns 22 provided in different areas of the first surface of the light guide portion 10. The multiple main patterns 22 are provided in the different areas of the light guide portion 10 having a streamlined shape and create line-shaped beams having different optical paths. The multiple main patterns 22 may be implemented as uneven patterns provided on the first surface of the light guide portion 10 and having respective inclined surfaces inclined with respect to the first surface.

Such a configuration of the three-dimensional effect forming portion is substantially similar or identical to that of the three-dimensional effect forming portion of the lighting device 300 previously described with reference to FIG. 16.

The multi-effect forming portion 30 includes the multiple optical patterns provided in different areas of the second surface. The multiple optical patterns create the multiple line-shaped beams BL2, BL3 by converting single line-shaped beams into the multiple line-shaped beams.

The light source portion 50 is arranged on an edge of one surface of the light guide portion according to a streamlined shape of the light guide portion 10. The light source portion 50 may include a plurality of LED light sources.

The light guide portion 10, the three-dimensional effect forming portion 20, the multi-effect forming portion 30 and the light source portion 50 may be substantially identical to any one of the lighting devices according to the previously described embodiments except for the fact that the light guide portion 10 has the streamlined shape.

The outer lens 710 refers to a lens-shaped cover disposed on an outer surface of the lighting device such as a lighting device for a vehicle (a headlight, a rear light and the like), an outdoor lighting device and the like. The outer lens 710 may be provided using a transparent plastic material such as engineering plastic and so on.

When the outer lens 710 is used in vehicles, the outer lens 710 may be provided on one surface where the light guide portion 10 is disposed, so as to have a curvature leading to a curved surface of a vehicle body. Also, when the lighting device 700 is used as vehicle lighting, the light source of the light source portion 50 may be operated by power supplied from a vehicle battery 720.

The light guide portion 10, the three-dimensional effect forming portion 20, the multi-effect forming portion 30 and the light source portion 50 are disposed on one surface of the outer lens 710. The light guide portion 10 may be adhered to the one surface of the outer lens 710 or may be disposed to be separated from the outer lens by a predetermined distance. Also, the light source portion 50 may be disposed on the one surface of the outer lens 710 to be buried in the light guide portion 10, but is not limited thereto.

According to the present embodiment, through a design of the main patterns of the three-dimensional effect forming portion, it can be provided with the lighting devices useful for lighting devices for vehicles, such as a headlight, a rear light, car indoor illumination, a fog lamp, a door scarf or the like. That is, in terms of a volume, a thickness, a weight, a price, a life span, stability, a degree of freedom in design, and easiness of installation, the lighting device 500 of the present embodiment may be usefully applied compared to the existing lamps for vehicles.

Meanwhile, the lighting device 700 of the present embodiment is not limited to a lighting device for vehicles, and may be easily applied to a curve portion or a bent portion inside or outside an object for illustration installation, such as a building, equipment, furniture and the like, as a flexible lighting device in a film form. In this case, the outer lens 710 may be an optical member in which the light guide portion, the three-dimensional effect forming portion and the multi-effect forming portion are combined, and/or a support member for supporting the light source portion, or a housing. In this case, the outer lens 710 may have light transmittance and transparency beyond a predetermined standard which enables the inside to be visible from the outside.

As set forth above, some embodiments of the present application may provide the lighting device capable of creating a single line shaped beam by controlling an optical path, an optical width and a luminance change via a pattern design and converting the single line-shaped beam into multiple line-shaped beams and may also provide the optical member used in the lighting device.

Some embodiments of the present application may provide the optical member that can make an entire thickness of the device thinner by using the flexible light guide portion and can be easily utilized in various application products related with illumination thanks to the slimming of the thickness and may also provide the lighting device using the optical member. That is, as the device is provided with flexibility by using the flexible printed circuit board and the flexible light guide portion, the lighting device can have the improved degree of freedom in design of the lighting device and reliability.

Some embodiments of the present application may provide the lighting device capable of implementing various optical images having desired shapes and a three-dimensional effect in various lighting fields such as general lighting, design lighting, vehicle lighting and the like and capable of enabling mass production at a low cost and may also provide the optical member used in the lighting device.

An aspect of embodiments of the present application may provide a lighting device capable of creating single line-shaped beams having a three-dimensional effect by controlling an optical path, an optical width and a luminance change and capable of converting the single line-shaped beam into multiple line-shaped beams, and an optical member used in the lighting device.

Another aspect of embodiments of the present application may provide an optical member capable of implementing a line-shape beam having a three-dimensional effect and for enabling slimming of the thickness of a lighting device. That is, as the lighting device including a flexible printed circuit board and the optical member has flexibility, the lighting device for enabling improvement of the degree of freedom in a product design and ensuring reliability can be provided.

A further aspect of embodiments of the present application may provide a lighting device capable of implementing optical images in various shapes having a three-dimensional effect in various kinds of lighting fields such as general lighting, design lighting, vehicle lighting and so on.

According to an aspect of the embodiments of the present application, there is provided an optical member, including; a light guide portion provided as a base substrate; a three-dimensional effect forming portion formed on a first surface of the light guide portion; and a multi-effect forming portion having a lamination structure with the three-dimensional effect forming portion. The three-dimensional effect forming portion may include multiple main patterns sequentially arranged on the first surface in a first direction and having respective inclined surfaces with inclined angle with respect to the first surface, wherein the multiple main patterns guide an incident beam to a first surface direction toward which the first surface looks, or a second surface direction toward which the second surface looks by refraction and reflection from the inclined surfaces, thereby creating a line-shaped beam of a first path crossing at right angles to each pattern extension direction of the multiple patterns. Furthermore, the multi-effect forming portion includes multiple optical patterns sequentially arranged in a second direction crossing a first direction and configured for converting a single line-shaped beam of the first path into multiple line-shaped beams.

According to another aspect of the embodiments of the present application, there is provided a lighting device, including: an optical member according to the aforesaid embodiment; and a light source portion for irradiating light to the optical member. Here, the light guide portion of the optical member has one side having a thickness beyond a height of a light emitting surface of a light source of the light source portion. The incident beam emitted from the light source is internally reflected from one side of the light guide portion to an external surface of the light guide portion or moves to another side facing one side in the inside of the light guide portion.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present application and is not to be construed as limited to the specific embodiments disclosed, and that modifications to the disclosed embodiments, as well as other embodiments, are intended to be included within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A lighting device comprising:
   an optical member having a width in a first direction and a length in a second direction; and a plurality of light sources that irradiates light to the optical member and arranged along the length of the optical member in the second direction,
wherein the optical member comprises
a light guide portion;
a first converting portion disposed on a first surface of the light guide portion; and
a second converting portion disposed on a second surface of the light guide portion,
wherein the first converting portion comprises multiple main patterns arranged on the first surface and having inclined surfaces with an angle of inclination relative to the first surface, each of the multiple main patterns extending in the second direction and arranged adjacent to each other in the first direction,
wherein the second converting portion includes multiple optical patterns each extending in the first direction and arranged adjacent to each other in the second direction,
wherein the multiple main patterns reflect an incident beam so as to create a line-shaped beam crossing at right angles to each pattern extension direction of the multiple main patterns,
wherein each of the multiple main patterns extend parallel to each other in the second direction along the length of the optical member, each of the multiple main patterns having a prescribed number of sections in which one section extends at a prescribed angle from a distal end of an adjacent section to form a zigzag shape,
wherein each of the multiple optical patterns extend in the first direction along the width of the optical member, each of the multiple optical patterns being arranged at an angle relative to each other to form a prescribed number of sections adjacent to each other along the second direction, wherein the prescribed number of sections form alternating V shapes arranged in the second direction and the angle between adjacent sections is greater near edges of the optical member than near a center of the optical member, and
wherein each of the prescribed number of sections of the multiple main patterns are arranged to vertically overlap a corresponding one of the prescribed number of sections of the multiple optical patterns to form pairs of main pattern and optical pattern.

2. The lighting device of claim 1,
wherein the multiple main patterns serve as indirect light sources in which optical paths become longer as a distance from a light source increases gradually, thereby creating the line-shaped beam having a three-dimensional effect in a thickness direction of the light guide portion, and
wherein the multiple main patterns have: a first optical path from the light source; a second optical path longer than the first optical path; a third optical path longer than the second optical path, and comprise first main patterns, second main patterns and third main patterns that are sequentially arranged,
wherein a second distance from a second dummy light source of the light source resulting from an inclined surface of the second main pattern to the inclined surface of the second main pattern is longer than a first distance from a first dummy light source of the light source resulting from an inclined surface of the first main pattern to the inclined surface of the first main pattern, and the second distance is shorter than a third distance from a third dummy light source of the light source resulting from an inclined surface of the third main pattern to the inclined surface of the third main pattern.

3. The lighting device of claim 1, wherein the multiple main patterns provide a line-shaped beam displayed by traveling along the pattern extension directions in a direction opposite to a movement direction of a standard point or an observing point according to movement of the standard point or the observing point,
wherein the pattern extension directions of the multiple main patterns are parallel to each other.

4. The lighting device of claim 1, wherein the first converting portion comprises main patterns of a first group and main patterns of a second group that are provided in different areas of the first surface of the light guide portion, and a first pattern arrangement direction of the main patterns of the first group and a second pattern arrangement direction of the main patterns of the second group extend in directions different from each other,
wherein the main patterns of the first group and the main patterns of the second group are integrally provided in a pattern extension direction, and a boundary between the main patterns of the first group and the main patterns of the second group is provided as a bending portion.

5. The lighting device of claim 1, wherein a cross section of each inclined surface of the multiple main patterns has a straight lined shape, a curve shape, a broken-line graph-like shape or a combination shape thereof.

6. The lighting device of claim 1, wherein the light guide portion is made of glass or resin including a thermoplastic polymer or a photo curable polymer.

7. The lighting device of claim 1, wherein the second converting portion is provided in a form in which a part of the second surface of the light guide portion is removed, or is provided as a second pattern layer disposed on the second surface.

8. A lighting device having an optical member according to claim 1,
wherein a light guide portion of the optical member has one side having a thickness beyond a height of a light emitting surface of a light source, and an incident beam emitted from the light source is internally reflected from the one side of the light guide portion to an external surface of the light guide portion or moves to another side facing the one side.

9. The lighting device of claim 1, wherein the light source is buried by the light guide portion, and wherein the light guide portion comprises a resin layer.

10. The lighting device of claim 1, wherein the first converting portion is buried by the light guide portion.

11. The lighting device of claim 1, wherein the first light source and the second light source irradiate light in directions parallel to each other, or irradiate light in directions crossing each other.

12. The lighting device of claim 1, wherein the first light source and the second light source irradiate light from opposite directions to another opposite directions on one straight line or to another opposite directions parallel to each other, or irradiate light in directions from each other having an angle of more than 90° and less than 180° between the first light source and the second light source.

13. The lighting device of claim 1, wherein the plurality of light sources comprises an LED (Light Emitting Diode) Element.

14. The lighting device of claim 1, further comprising a printed circuit board to which the plurality of light sources is mounted, wherein the optical member is disposed on the printed circuit board so that the plurality of light sources is embedded it the optical member.

15. The lighting device of claim 3, wherein the pattern extension directions of the multiple main patterns cross each other, and a path of the line-shaped beam is bent to have a curvature to a side in which the pattern extension directions cross each other.

16. The lighting device of claim 4, wherein the main patterns of the first group and the main patterns of the second group are integrally provided in a pattern extension direction, and a boundary between the main patterns of the first group and the main patterns of the second group is provided as a bending portion.

17. The lighting device of claim 6, wherein the light guide portion has a thickness of 0.1 mm or more and 10.0 mm or less.

18. The lighting device of claim 7, further comprising an adhesive layer between the light guide portion and the first pattern layer or between the light guide portion and the second pattern layer.

19. The lighting device of claim 9, further comprising a support member or a housing for supporting the optical member, the plurality of light sources, the light guide portion or a combination thereof.

20. The lighting device of claim 9, further comprising an outer lens intended for covering the optical member, wherein the optical member is disposed on one surface of the outer lens, and the plurality of light sources is operated by battery power embedded in a vehicle.

* * * * *